(12) United States Patent
Fawaz et al.

(10) Patent No.: US 10,089,582 B2
(45) Date of Patent: Oct. 2, 2018

(54) USING NORMALIZED CONFIDENCE VALUES FOR CLASSIFYING MOBILE DEVICE BEHAVIORS

(71) Applicant: QUALCOMM Incorporated, San Diego, CA (US)

(72) Inventors: Kassem Fawaz, Ann Arbor, MI (US); Vinay Sridhara, Santa Clara, CA (US); Rajarshi Gupta, Sunnyvale, CA (US); Yin Chen, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 14/826,430

(22) Filed: Aug. 14, 2015

(65) Prior Publication Data

US 2015/0356462 A1    Dec. 10, 2015

Related U.S. Application Data

(63) Continuation-in-part of application No. 14/090,261, filed on Nov. 26, 2013, now Pat. No. 9,684,870.
(Continued)

(51) Int. Cl.
*G06F 17/00* (2006.01)
*G06N 7/00* (2006.01)
(Continued)

(52) U.S. Cl.
CPC .......... *G06N 99/005* (2013.01); *G06N 5/025* (2013.01); *G06N 5/043* (2013.01)

(58) Field of Classification Search
CPC ....... G06N 99/005; G06N 5/025; G06N 5/043
(Continued)

(56) References Cited

U.S. PATENT DOCUMENTS

| | | |
|---|---|---|
| 5,870,735 A | 2/1999 | Agrawal et al. |
| 6,532,541 B1 | 3/2003 | Chang et al. |
| | (Continued) | |

FOREIGN PATENT DOCUMENTS

| | | |
|---|---|---|
| CN | 1961525 A | 5/2007 |
| CN | 101291509 A | 10/2008 |
| | (Continued) | |

OTHER PUBLICATIONS

Towards the Full Model Selection in temporal databases by using micro-differential evolution. An empirical study Nancy Pérez-Castro; Héctor-Gabriel Acosta-Mesa; Efrén Mezura-Montes; Nicandro Cruz-Ramírez 2015 IEEE International Autumn Meeting on Power, Electronics and Computing (ROPEC) Year: 2015 pp. 1-6 IEEE Conference.*
(Continued)

*Primary Examiner* — Michael B Holmes
(74) *Attorney, Agent, or Firm* — The Marbury Law Group

(57) ABSTRACT

Methods and systems for classifying mobile device behavior include generating a full classifier model that includes a finite state machine suitable for conversion into boosted decision stumps and/or which describes all or many of the features relevant to determining whether a mobile device behavior is benign or contributing to the mobile device's degradation over time. A mobile device may receive the full classifier model along with sigmoid parameters and use the model to generate a full set of boosted decision stumps from which a more focused or lean classifier model is generated by culling the full set to a subset suitable for efficiently determining whether mobile device behavior are benign. Results of applying the focused or lean classifier model may be normalized using a sigmoid function, with the resulting
(Continued)

normalized result used to determine whether the behavior is benign or non-benign.

30 Claims, 22 Drawing Sheets

Related U.S. Application Data

(60) Provisional application No. 61/874,129, filed on Sep. 5, 2013, provisional application No. 61/748,217, filed on Jan. 2, 2013, provisional application No. 61/748,220, filed on Jan. 2, 2013.

(51) Int. Cl.
  *G06N 7/08* (2006.01)
  *G06N 99/00* (2010.01)
  *G06N 5/04* (2006.01)
  *G06N 5/02* (2006.01)

(58) Field of Classification Search
  USPC .......................................................... 706/59
  See application file for complete search history.

(56) References Cited

U.S. PATENT DOCUMENTS

| | | | |
|---|---|---|---|
| 6,643,802 B1 | 11/2003 | Frost et al. | |
| 6,647,260 B2 | 11/2003 | Dusse et al. | |
| 7,051,327 B1 | 5/2006 | Milius et al. | |
| 7,401,359 B2 | 7/2008 | Gartside et al. | |
| 7,424,619 B1* | 9/2008 | Fan ..................... G06F 21/552 713/188 | |
| 7,559,053 B2 | 7/2009 | Krassovsky et al. | |
| 7,561,877 B2 | 7/2009 | Cassett et al. | |
| 7,571,478 B2 | 8/2009 | Munson et al. | |
| 7,600,014 B2 | 10/2009 | Russell et al. | |
| 7,650,317 B2 | 1/2010 | Basu et al. | |
| 7,676,573 B2 | 3/2010 | Herzog et al. | |
| 7,694,150 B1 | 4/2010 | Kirby | |
| 7,757,292 B1 | 7/2010 | Renert et al. | |
| 7,774,599 B2 | 8/2010 | Guo et al. | |
| 7,831,237 B2 | 11/2010 | Passarella et al. | |
| 7,831,248 B2 | 11/2010 | Lee | |
| 7,849,360 B2 | 12/2010 | Largman et al. | |
| 7,852,938 B2 | 12/2010 | Shi et al. | |
| 7,877,621 B2 | 1/2011 | Jacoby et al. | |
| 7,881,291 B2 | 2/2011 | Grah | |
| 7,890,443 B2 | 2/2011 | Zhang et al. | |
| 7,945,955 B2 | 5/2011 | Katkar | |
| 8,045,958 B2 | 10/2011 | Kahandaliyanage | |
| 8,087,067 B2 | 12/2011 | Mahaffey et al. | |
| 8,095,964 B1 | 1/2012 | Zhong et al. | |
| 8,108,929 B2 | 1/2012 | Agrawal et al. | |
| 8,161,548 B1 | 4/2012 | Wan | |
| 8,201,244 B2 | 6/2012 | Sun et al. | |
| 8,201,249 B2 | 6/2012 | McCallam | |
| 8,225,093 B2 | 7/2012 | Fok | |
| 8,245,295 B2 | 8/2012 | Park et al. | |
| 8,245,315 B2 | 8/2012 | Cassett et al. | |
| 8,266,698 B1 | 9/2012 | Seshardi et al. | |
| 8,311,956 B2 | 11/2012 | Sen et al. | |
| 8,312,545 B2 | 11/2012 | Tuvell et al. | |
| 8,321,941 B2 | 11/2012 | Tuvell et al. | |
| 8,331,987 B2 | 12/2012 | Rosenblatt | |
| 8,332,945 B2 | 12/2012 | Kim et al. | |
| 8,347,386 B2 | 1/2013 | Mahaffey et al. | |
| 8,397,301 B2 | 3/2013 | Hering et al. | |
| 8,443,439 B2 | 5/2013 | Lamastra et al. | |
| 8,458,809 B2 | 6/2013 | Adams et al. | |
| 8,498,491 B1* | 7/2013 | Steffens ............... G06K 9/6292 382/224 | |
| 8,516,584 B2 | 8/2013 | Moskovitch et al. | |
| 8,533,844 B2 | 9/2013 | Mahaffey et al. | |
| 8,554,912 B1 | 10/2013 | Reeves et al. | |
| 8,694,744 B1 | 4/2014 | Raj et al. | |
| 8,701,192 B1 | 4/2014 | Glick et al. | |
| 8,713,680 B2 | 4/2014 | Park et al. | |
| 8,762,298 B1 | 6/2014 | Ranjan et al. | |
| 8,763,127 B2 | 6/2014 | Yao et al. | |
| 8,775,333 B1 | 7/2014 | Zahn | |
| 8,782,412 B2 | 7/2014 | Charles et al. | |
| 8,943,204 B2 | 1/2015 | Caldeira De Andrada et al. | |
| 9,432,361 B2 | 8/2016 | Mahaffey et al. | |
| 9,609,456 B2* | 3/2017 | Valencia ................... G06F 8/71 | |
| 9,652,362 B2* | 5/2017 | Gupta ................. G06F 11/3612 | |
| 9,684,787 B2* | 6/2017 | Sridhara ............... G06F 21/566 | |
| 9,684,870 B2* | 6/2017 | Fawaz ................... G06N 5/025 | |
| 9,686,023 B2* | 6/2017 | Sridhara ................ G06N 5/043 | |
| 9,690,635 B2* | 6/2017 | Gupta ..................... G06F 9/541 | |
| 9,703,962 B2* | 7/2017 | Salajegheh ......... G06F 11/3024 | |
| 9,710,752 B2* | 7/2017 | Salajegheh .............. G06N 5/04 | |
| 9,721,212 B2* | 8/2017 | Gupta ................... G06F 21/552 | |
| 9,756,066 B2* | 9/2017 | Gupta ..................... G06F 21/57 | |
| 9,787,695 B2* | 10/2017 | Gantman ............. G06N 99/005 | |
| 9,898,602 B2* | 2/2018 | Gupta ..................... G06F 21/56 | |
| 9,910,984 B2* | 3/2018 | Valencia ............... G06F 21/554 | |
| 2002/0099756 A1 | 7/2002 | Catthoor et al. | |
| 2004/0039924 A1 | 2/2004 | Baldwin et al. | |
| 2004/0068721 A1 | 4/2004 | O'Neill et al. | |
| 2004/0083366 A1 | 4/2004 | Nachenberg et al. | |
| 2004/0221163 A1 | 11/2004 | Jorgensen et al. | |
| 2005/0144480 A1 | 6/2005 | Kim et al. | |
| 2006/0026464 A1 | 2/2006 | Atkin et al. | |
| 2006/0085854 A1 | 4/2006 | Agrawal et al. | |
| 2006/0288209 A1 | 12/2006 | Vogler | |
| 2007/0006304 A1 | 1/2007 | Kramer et al. | |
| 2007/0136455 A1 | 6/2007 | Lee et al. | |
| 2007/0174490 A1 | 7/2007 | Choi et al. | |
| 2007/0192866 A1 | 8/2007 | Sagoo et al. | |
| 2007/0199060 A1 | 8/2007 | Touboul | |
| 2007/0220327 A1 | 9/2007 | Ruscio et al. | |
| 2007/0283170 A1 | 12/2007 | Yami et al. | |
| 2007/0287387 A1 | 12/2007 | Keum et al. | |
| 2007/0294768 A1 | 12/2007 | Moskovitch et al. | |
| 2008/0016339 A1 | 1/2008 | Shukla | |
| 2008/0026464 A1 | 1/2008 | Borenstein et al. | |
| 2008/0046755 A1 | 2/2008 | Hayes | |
| 2008/0047009 A1 | 2/2008 | Overcash et al. | |
| 2008/0086773 A1 | 4/2008 | Tuvell et al. | |
| 2008/0109495 A1 | 5/2008 | Herberger et al. | |
| 2008/0140821 A1 | 6/2008 | Tada | |
| 2008/0162686 A1 | 7/2008 | Kalaboukis et al. | |
| 2008/0163382 A1 | 7/2008 | Blue et al. | |
| 2008/0172746 A1 | 7/2008 | Lotter et al. | |
| 2008/0228429 A1 | 9/2008 | Huang et al. | |
| 2008/0263398 A1 | 10/2008 | Mori et al. | |
| 2008/0301796 A1 | 12/2008 | Holostov et al. | |
| 2009/0019551 A1 | 1/2009 | Haga et al. | |
| 2009/0099990 A1* | 4/2009 | Xiao ..................... G06K 9/6256 706/46 | |
| 2009/0192955 A1 | 7/2009 | Tang et al. | |
| 2009/0199296 A1 | 8/2009 | Xie et al. | |
| 2009/0217078 A1 | 8/2009 | Cassett et al. | |
| 2009/0239531 A1 | 9/2009 | Andreasen et al. | |
| 2009/0287618 A1 | 11/2009 | Weinberger et al. | |
| 2009/0288080 A1 | 11/2009 | Partridge | |
| 2009/0288164 A1 | 11/2009 | Adelstein et al. | |
| 2009/0293121 A1 | 11/2009 | Bigus et al. | |
| 2009/0300765 A1 | 12/2009 | Moskovitch et al. | |
| 2009/0327168 A1 | 12/2009 | Weinberger et al. | |
| 2010/0005045 A1 | 1/2010 | Hiraoka et al. | |
| 2010/0010949 A1 | 1/2010 | Ito et al. | |
| 2010/0011029 A1 | 1/2010 | Niemelae | |
| 2010/0036786 A1 | 2/2010 | Pujara | |
| 2010/0082513 A1 | 4/2010 | Liu | |
| 2010/0105404 A1 | 4/2010 | Palanki et al. | |
| 2010/0107257 A1 | 4/2010 | Ollmann | |
| 2010/0128125 A1 | 5/2010 | Warzelhan | |
| 2010/0153371 A1 | 6/2010 | Singh | |
| 2010/0154032 A1 | 6/2010 | Ollmann | |
| 2010/0175135 A1 | 7/2010 | Kandek et al. | |
| 2010/0192201 A1 | 7/2010 | Shimoni et al. | |
| 2010/0192222 A1 | 7/2010 | Stokes et al. | |

(56) References Cited

U.S. PATENT DOCUMENTS

| | | |
|---|---|---|
| 2010/0241974 A1 | 9/2010 | Rubin et al. |
| 2010/0251340 A1 | 9/2010 | Martin et al. |
| 2010/0262693 A1 | 10/2010 | Stokes et al. |
| 2010/0296496 A1 | 11/2010 | Sinha et al. |
| 2010/0299292 A1 | 11/2010 | Collazo |
| 2010/0313269 A1 | 12/2010 | Ye |
| 2011/0004935 A1 | 1/2011 | Moffie et al. |
| 2011/0013528 A1 | 1/2011 | Chen |
| 2011/0023118 A1 | 1/2011 | Wright |
| 2011/0060948 A1 | 3/2011 | Beebe |
| 2011/0105096 A1 | 5/2011 | Dods et al. |
| 2011/0145920 A1 | 6/2011 | Mahaffey et al. |
| 2011/0161452 A1 | 6/2011 | Poornachandran et al. |
| 2011/0219449 A1 | 9/2011 | St. Neitzel et al. |
| 2011/0264764 A1 | 10/2011 | Kewalramani et al. |
| 2011/0286437 A1 | 11/2011 | Austin et al. |
| 2011/0302654 A1 | 12/2011 | Miettinen |
| 2011/0302856 A1 | 12/2011 | El-Moussa Fadi |
| 2011/0307233 A1 | 12/2011 | Tseng et al. |
| 2012/0016633 A1 | 1/2012 | Wittenstein et al. |
| 2012/0051228 A1 | 3/2012 | Shuman et al. |
| 2012/0060219 A1 | 3/2012 | Larsson et al. |
| 2012/0096539 A1 | 4/2012 | Hu et al. |
| 2012/0110174 A1 | 5/2012 | Wootton et al. |
| 2012/0131185 A1 | 5/2012 | Petersen et al. |
| 2012/0131674 A1 | 5/2012 | Wittenschlaeger |
| 2012/0151062 A1 | 6/2012 | Gusev et al. |
| 2012/0159633 A1 | 6/2012 | Grachev et al. |
| 2012/0167162 A1 | 6/2012 | Raleigh et al. |
| 2012/0167217 A1 | 6/2012 | McReynolds |
| 2012/0167218 A1 | 6/2012 | Poornachandran et al. |
| 2012/0167219 A1 | 6/2012 | Zaitsev et al. |
| 2012/0180126 A1 | 7/2012 | Liu et al. |
| 2012/0207046 A1 | 8/2012 | Di Pietro et al. |
| 2012/0210388 A1 | 8/2012 | Kolishchak |
| 2012/0210423 A1 | 8/2012 | Friedrichs et al. |
| 2012/0227105 A1 | 9/2012 | Friedrichs et al. |
| 2012/0233694 A1 | 9/2012 | Baliga et al. |
| 2012/0245481 A1 | 9/2012 | Blanco et al. |
| 2012/0254333 A1 | 10/2012 | Chandramouli et al. |
| 2012/0270611 A1 | 10/2012 | Choi et al. |
| 2012/0311366 A1 | 12/2012 | Alsina et al. |
| 2012/0311708 A1 | 12/2012 | Agarwal et al. |
| 2012/0317306 A1 | 12/2012 | Radinsky et al. |
| 2012/0321175 A1 | 12/2012 | Hedau et al. |
| 2012/0323853 A1 | 12/2012 | Fries et al. |
| 2012/0331137 A1 | 12/2012 | Olsen et al. |
| 2013/0014262 A1 | 1/2013 | Lee et al. |
| 2013/0031600 A1 | 1/2013 | Luna et al. |
| 2013/0041859 A1* | 2/2013 | Esterlilne .......... G06N 3/02 706/25 |
| 2013/0066815 A1 | 3/2013 | Oka et al. |
| 2013/0073983 A1 | 3/2013 | Rasmussen et al. |
| 2013/0097706 A1 | 4/2013 | Titonis et al. |
| 2013/0151848 A1 | 6/2013 | Baumann et al. |
| 2013/0167231 A1 | 6/2013 | Raman et al. |
| 2013/0179991 A1 | 7/2013 | White et al. |
| 2013/0203440 A1 | 8/2013 | Bilange et al. |
| 2013/0204812 A1 | 8/2013 | Sterzing et al. |
| 2013/0247187 A1 | 9/2013 | Hsiao et al. |
| 2013/0267201 A1 | 10/2013 | Gupta et al. |
| 2013/0303154 A1 | 11/2013 | Gupta et al. |
| 2013/0303159 A1 | 11/2013 | Gathala et al. |
| 2013/0304676 A1 | 11/2013 | Gupta et al. |
| 2013/0304677 A1 | 11/2013 | Gupta et al. |
| 2013/0304869 A1 | 11/2013 | Gupta et al. |
| 2013/0305101 A1 | 11/2013 | Gupta et al. |
| 2013/0305358 A1 | 11/2013 | Gathala et al. |
| 2013/0305359 A1 | 11/2013 | Gathala et al. |
| 2014/0007183 A1 | 1/2014 | Qureshi et al. |
| 2014/0032358 A1 | 1/2014 | Perkowitz et al. |
| 2014/0051432 A1 | 2/2014 | Gupta et al. |
| 2014/0053260 A1 | 2/2014 | Gupta et al. |
| 2014/0053261 A1 | 2/2014 | Gupta et al. |
| 2014/0096246 A1 | 4/2014 | Morrissey et al. |
| 2014/0150100 A1 | 5/2014 | Gupta et al. |
| 2014/0187177 A1 | 7/2014 | Sridhara et al. |
| 2014/0188781 A1 | 7/2014 | Fawaz et al. |
| 2014/0205099 A1 | 7/2014 | Christodorescu et al. |
| 2014/0237595 A1 | 8/2014 | Sridhara et al. |
| 2014/0245306 A1 | 8/2014 | Gathala et al. |
| 2014/0279745 A1 | 9/2014 | Esponda et al. |
| 2014/0317734 A1 | 10/2014 | Valencia et al. |
| 2014/0337862 A1 | 11/2014 | Valencia et al. |
| 2015/0148109 A1 | 5/2015 | Gupta et al. |
| 2015/0339675 A1 | 11/2015 | Tuchman et al. |
| 2016/0088009 A1 | 3/2016 | Gupta et al. |

FOREIGN PATENT DOCUMENTS

| | | |
|---|---|---|
| CN | 101689167 A | 3/2010 |
| CN | 101770453 A | 7/2010 |
| CN | 101882000 A | 11/2010 |
| CN | 102110211 A | 6/2011 |
| CN | 102202102 A | 9/2011 |
| CN | 102222192 A | 10/2011 |
| CN | 102369514 A | 3/2012 |
| CN | 102591696 A | 7/2012 |
| CN | 102651061 A | 8/2012 |
| CN | 102790758 A | 11/2012 |
| CN | 102812441 A | 12/2012 |
| EP | 1182552 A2 | 2/2002 |
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2515250 A1 | 10/2012 |
| EP | 2680182 A1 | 1/2014 |
| JP | 2005534092 A | 11/2005 |
| JP | 2006053788 A | 2/2006 |
| JP | 2008234520 A | 10/2008 |
| JP | 2010113488 A | 5/2010 |
| JP | 2010520566 A | 6/2010 |
| JP | 2010257227 A | 11/2010 |
| JP | 2011138219 A | 7/2011 |
| JP | 2012212380 A | 11/2012 |
| KR | 20060033067 A | 4/2006 |
| TW | 200937198 A | 9/2009 |
| TW | 201129817 A | 9/2011 |
| TW | 201239618 A | 10/2012 |
| WO | 06012375 | 2/2006 |
| WO | 2009017231 A2 | 2/2009 |
| WO | 2010048502 | 4/2010 |
| WO | 2010126416 A1 | 11/2010 |
| WO | 2011147580 A1 | 12/2011 |
| WO | 2012087685 A1 | 6/2012 |
| WO | 2013016692 | 1/2013 |
| WO | 2013080096 A1 | 6/2013 |
| WO | 2013172865 A1 | 11/2013 |
| WO | 2013173003 A2 | 11/2013 |
| WO | 2013173044 A2 | 11/2013 |

OTHER PUBLICATIONS

On the optimization of SVM kernel parameters for improving audio classification accuracy Lacrimioara Grama; Liana Tuns; Corneliu Rusu 2017 14th International Conference on Engineering of Modern Electric Systems (EMES) Year: 2017 pp. 224-227 IEEE Conferences.*

Hu W., et al., "Online Adaboost-Based Parameterized Methods for Dynamic Distributed Network Intrusion Detection", IEEE Transactions on Cybernetics, vol. 44, No. 1, Mar. 27, 2013 (Mar. 27, 2013), pp. 66-82, XP011533908, DOI: 10.1109/TCYB.2013.2247592.

Jean E., et al., "Addressing Mobile Agent Security Through Agent Collaboration", Journal of Information Processing Systems, vol. 3, No. 2, Dec. 2007 (Dec. 2007), pp. 43-53, XP055341844, DOI: 10.3745/JIPS.2008.3.2.043.

Abu-Nimeh S., "Phishing detection using distributed Bayesian additive regression trees", Dec. 13, 2008 (Dec. 13, 2008), Southern Methodist University, 28 pages, XP055107295, ISBN: 9780549908630 chapters 2, 4, 6 and 8.

(56) References Cited

OTHER PUBLICATIONS

Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.

Caruana, et al., "An Empirical Comparison of Supervised Learning Algorithms", ICML, 2006, 8 pgs.

Caruana, et al., "An Empirical Evaluation of Supervised Learning in High Dimensions", ICML, 2008, 8 pgs.

Chekina L., et al., "Detection of deviations in mobile applications network behavior", arXiv:1208.0564v2, Aug. 5, 2012 (Aug. 5, 2012), 5 pages, XP055107301, Retrieved from the Internet: URL: http://arxiv.org/abs/1208.0564v2 [retrieved on Nov. 1, 2013] the whole document.

De Stefano C., et al., "Pruning GP-Based Classifier Ensembles by Bayesian Networks," Lecture Notes in Computer Science, Sep. 1, 2012 (Sep. 1, 2012), pp. 236-245, XP047016355, DOI: 10.1007/978-3-642-32937-1_24, Sections 1 and 2.

Folino G., et al., "An ensemble-based evolutionary framework for coping with distributed intrusion detection", Genetic Programming and Evolvable Machines, vol. 11, No. 2, Feb. 7, 2010 (Feb. 7, 2010), pp. 131-146, XP019789345, DOI: 10.1007/S10710-010-9101-6 the whole document.

Gao J., et al., "Adaptive distributed intrusion detection using parametric model", Proceedings of the 2009 IEEE/WIC/ACM International Joint Conferences on Web Intelligence and Intelligent Agent Technologies (WI-IAT'09), vol. 1, Sep. 15, 2009 (Sep. 15, 2009), pp. 675-678, XP055107983, DOI: 10.1109/WI-IAT.2009.113 the whole document.

Gavin McWilliams: "Malware detection methods for fixed and mobile networks", Centre for Secure Information Technologies—Queen's University Belfast, Jan. 23, 2013 (Jan. 23, 2013), pp. 1-21, XP017577639, [retrieved on Jan. 23, 2013] the whole document.

Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.

International Search Report and Written Opinion—PCT/US2013/078352—ISA/EPO—dated Nov. 10, 2014.

Jarle Kittilsen: "Detecting malicious PDF documents", Dec. 1, 2011 (Dec. 1, 2011), pp. 1-112, XP055947997, Gjovik, Norway Retrieved from the Internet: URL:http:f/brage.bibsys.no/hig/retrieve/2128/JarleKittilsen.pdf [retrieved on Dec. 14, 2012] the whole document.

Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007 (Nov. 5, 2007), pp. 516-520, XP031200055, DOI: 10.1109/WI-IATW.2007.52 the whole document.

Kachirski O., et al., "Effective Intrusion Detection Using Windows Sensors in Wireless Ad Hoc Networks", IEEE Proceedings of the 36th Hawaii International Conference on System Sciences, 2002, 8 Pages.

Kaspersky Endpoint Security 8 for Smartphone Program Version 8.0, Updated on Feb. 8, 2012.

Kirda E., et al., "Behavior-Based Spyware Detection", 15th USENIX Security Symposium, 2002, pp. 273-288.

Kolter J.Z., et al., "Learning to Detect Malicious Executables in the Wild", ACM Knowl. Discovery and Data Mining (KDD), 2004, pp. 470-478.

Lu Y. B., et al., "Using Multi-Feature and Classifier Ensembles to Improve Malware Detection", Journal of Chung Cheng Institute of Technology, vol. 39, No. 2, Nov. 2010 (Nov. 2010), pp. 57-72, XP55086345, ISSN: 0255-6030.

Miluzzo E., et al., "Vision: mClouds—computing on clouds of mobile devices", Proceedings of the 3rd ACM Workshop on Mobile Cloud Computing and Services (MCS'12), Jun. 25, 2012 (Jun. 25, 2012), pp. 9-14, XP055107956, DOI: 10.1145/2307849.2307854 the whole document.

Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012 (Apr. 2012), pp. 349-358, XP55086347, ISSN: 2249-955.

Qin F., "System Support for Improving Software Dependability During Production Runs," Urbana, Illinois, 1998, pp. 1-116.

Saller K., et al., "Reducing Feature Models to Improve Runtime Adaptivity on Resource Limited Devices," Proceedings of the 16th International Software Product Line Conference (SPLC), Sep. 2, 2012 (Sep. 2, 2012), vol. 11, pp. 135-142, XP058009814, DOI: 10.1145/2364412.2364435, Section 5.

Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.

Schmidt A.D., et al., "Static analysis of executables for collaborative malware detection on android", Proceedings of the 2009 IEEE International Conference on Communications (ICC'09), Jun. 14, 2009 (Jun. 14, 2009), 3 Pages, XP031506460, DOI: 10.1109/ICC.2009.5199486 the whole document.

Shabtai A., et al., "A Andromalya: a behavioral malware detection framework for android devices", Journal of Intelligent Information Systems, Kluwer Academic Publishers, BO, vol. 38, No. 1, Jan. 6, 2011 (Jan. 6, 2011), pp. 161-190, XP019998836, ISSN: 1573-7675, DOI: 10.1007/S10844-010-0148-X paragraph [5.3.1]-paragraph [5.3.4].

Shabtai A., et al., "Dectecting unknown malicious code by applying classification techniques on OpCode patterns," Security Informatics a Springer Open Journal, 2012, vol. 1 (1), pp. 1-22.

Shabtai A., "Malware Detection on Mobile Devices," Eleventh International Conference on Mobile Data Management, IEEE Computer Society, 2010, pp. 289-290.

Shamili A.S., et al., "Malware detection on mobile devices using distributed machine teaming", Proceedings of the 20th International Conference on Pattern Recognition (ICPR'10), Aug. 23, 2010 (Aug. 23, 2010), pp. 4348-4351, XP031772702, DOI: 10.1109/ICPR.2010.1057 the whole document.

Sheen S., et al., "Network Intrusion Detection using Feature Selection and Decision tree classifier," TENCON—IEEE Region 10 Conference, 2008, pp. 1-4.

Tabish S.M., "Malware detection using statistical analysis of byte-level file content", Proceedings of the ACM SIGKDD Workshop on Cybersecurity and Intelligence Informatics (CSI-KDD'09), Jun. 28, 2009 (Jun. 28, 2009), pp. 23-31, XP055107225, DOI: 10.1145/1599272.1599278 the whole document.

Wang Y-M., et al., "Strider: A Black-Box, State-based Approach to Change and Configuration Management and Support" 2003 LISA XVII—Oct. 26-31, 2003—San Diego, CA, pp. 165-178.

Yerima.S.Y. et al., "A New Android Malware Detection Approach Using Bayesian Classification", 2014 IEEE 28th International Conference on advanced Information Networking and Applications, IEEE, Mar. 25, 2013 (Mar. 25, 2013), pp. 121-128, XP032678454, ISSN: 1550-445X, DOI: 10.1109/AINA.2013.88 ISBN: 978-1-4673-5550-6 [retrived on Jun. 13, 2013] the whole document.

Kimura S., et al., "Activity Recognition on a Mobile Device by Generation Method of Classification Model", The Special Interest Group Technical Reports of IPSJ, Japan, Information Processing Society of Japan, 2012, vol. 2012-IOT-16, No. 20, pp. 1-6.

Sugaya M., et al., "Suggest of Online Proactive Failure Prediction System for Embedded Systems", The Special Interest Group Technical Reports of IPSJ, Japan, Information Processing Society of Japan, 2010, vol. 2010-SLDM-144, No. 62, pp. 1-8.

International Search Report and Written Opinion—PCT/US2016/041470—ISA/EPO—dated Oct. 7, 2016.

Niculescu-Mizil A., et al., "Predicting Good Probabilities with Supervised Learning", Proceedings/Twenty-Second International Conference on Machine Learning, Bonn, Germany, Aug. 7-11, 2005, Association for Computing Machinery, New York, Aug. 7, 2005 (Aug. 7, 2005), pp. 625-632, XP058203964,DOI: 10.1145/1102351.11024301SBN: 978-1-59593-180-1.

(56) References Cited

OTHER PUBLICATIONS

Faddoul J.B., et al., "Boosting Multi-Task Weak Learners with Applications to Textual and Social Data," Ninth International Conference on Machine Learning and Applications (ICMLA), Dec. 2010, pp. 367-372.

Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9, 1999-May 12, 1999.

Tan, P.N., et al., "Introduction to data mining," Library of Congress, 2006, Chapter 4.

Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27, 2008-Aug. 1, 2008, pp. 160-165.

Kudo T., "Boosting with Subtree-based Decision Stumps and Its application to Semi-strucutred Text Classification," Decision Stumps and Boosting Algorithm, IEICE Technical Report, Oct. 30, 2003, vol. 103, No. 407, and NLC2003-25-34 Language understanding, communication, Japan, The Corporation, Institute of Electronics, Information and Communication Engineers, 8 Pages.

Burguera I., et al., "Crowdroid: Behavior-Based Malware Detection System for Android", Security and Privacy in Smartphones and Mobile Devices, Oct. 17, 2011, pp. 15-26.

\* cited by examiner

Example Boosted Decision Stumps

Performance of "Joint Feature Selection and Culling" Operations on the Boosted Decision Stumps

USING NORMALIZED CONFIDENCE VALUES FOR CLASSIFYING MOBILE DEVICE BEHAVIORS

RELATED APPLICATIONS

This application is a continuation in part of U.S. patent application Ser. No. 14/090,261, entitled "Methods and Systems of Using Boosted Decision Stumps and Joint Feature Selection and Pruning Algorithms for the Efficient Classification of Mobile Device Behaviors" filed Nov. 26, 2013, which claims the benefit of priority to U.S. Provisional Application No. 61/874,129, entitled "Methods and Systems of Using Boosted Decision Stumps and Joint Feature Selection and Pruning Algorithms for the Efficient Classification of Mobile Device Behaviors" filed Sep. 5, 2013, U.S. Provisional Patent Application No. 61/748,217 entitled "On-Device Real-Time Behavior Analyzer" filed Jan. 2, 2013, and U.S. Provisional Patent Application No. 61/748,220 entitled "Architecture for Client-Cloud Behavior Analyzer" filed Jan. 2, 2013, the entire contents of all of which are hereby incorporated by reference.

BACKGROUND

Cellular and wireless communication technologies have seen explosive growth over the past several years. This growth has been fueled by better communications, hardware, larger networks, and more reliable protocols. As a result wireless service providers are now able to offer their customers with unprecedented levels of access to information, resources, and communications.

To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

The various aspects include methods of generating lean behavior classifier models in a mobile device, which may include receiving in a processor of the mobile device a full classifier model that includes a finite state machine, and using the full classifier model to generate a lean classifier model in the mobile device. The finite state machine may include information that is suitable for conversion or expression as a plurality of boosted decision stumps, and each of the boosted decision stumps may include a test condition and a weight value. In an aspect, the method may further include using the lean classifier model in the mobile device to classify a behavior of the mobile device as being either benign or not benign (i.e., malicious, performance degrading, etc.).

In an aspect, generating the lean classifier model based on the full classifier model may include converting the finite state machine included in the full classifier model into a list of boosted decision stumps and generating the lean classifier model based on the boosted decision stumps included in the list of boosted decision stumps.

In an aspect, generating the lean classifier model based on the full classifier model further may include determining a number of unique test conditions that should be evaluated to classify a mobile device behavior without consuming an excessive amount of processing, memory, or energy resources of the mobile device, generating a list of test conditions by sequentially traversing the list of boosted decision stumps and inserting the test condition associated with each sequentially traversed boosted decision stump into the list of test conditions until the list of test conditions may include the determined number of unique test conditions, and generating the lean classifier model to include only those boosted decision stumps that test one of a plurality of test conditions included in the generated list of test conditions.

In an aspect, the method may include using the lean classifier model in the mobile device to classify a behavior of the mobile device as being either benign or not benign by applying collected behavior information to each boosted decision stump in the lean classifier model, computing a weighted average of the results of applying the collected behavior information to each boosted decision stump in the lean classifier model, and comparing the weighted average to a threshold value.

In an aspect, generating the lean classifier model based on the full classifier model may include converting the finite state machine included in the full classifier model into a list of boosted decision stumps, and generating a family of lean classifier models based on the boosted decision stumps included in the list of boosted decision stumps, the family of lean classifier models including the lean classifier model and a plurality of additional lean classifier models, each of the plurality of additional lean classifier models including a different number of unique test conditions.

In an aspect, generating a lean classifier model may include generating a plurality of lean classifier models that each includes a decision stump that tests a first condition using a different weight value and a different threshold value. An aspect, the method may include re-computing threshold values associated with boosted decision stumps in a plurality of lean classifier models generated in the mobile device based on the full classifier model. In an aspect, the method may include re-computing weight values associated with boosted decision stumps in a plurality of lean classifier models generated in the mobile device based on the full classifier model.

In an aspect, the method may include generating the full classifier model in a server by receiving in the server a corpus of information on mobile device behaviors, and generating the finite state machine based on the corpus of information on mobile device behaviors to include data that is suitable for conversion into the plurality of boosted decision stumps, and sending the finite state machine to the mobile device as the full classifier model. In an aspect, each of the plurality of test conditions are associated with a probability value that identifies a likelihood that its associated test condition will enable the mobile device to determine whether a mobile device behavior is benign, the method further including organizing the boosted decision stumps in the finite state machine based on probability values prior to sending the finite state machine to the mobile device as the full classifier model.

In a further aspect, the method may include using sigmoid parameters to compute and use a normalized confidence value for improved behavior classification, which may include receiving in a processor of the computing device from a server a full classifier model and sigmoid parameters, determining a normalized confidence value based on the sigmoid parameters, and classifying a device behavior of the computing device based on the normalized confidence value.

In an aspect, the method may include generating a list of boosted decision stumps by converting a finite state machine included in the full classifier model into boosted decision stumps, and generating a family of lean classifier models based on the boosted decision stumps included in the list of boosted decision stumps, in which classifying the device behavior of the computing device based on the normalized confidence value includes applying a behavior vector information structure to a first lean classifier model in the family of lean classifier models to generate analysis results, and determining whether to apply the behavior vector information structure to a second lean classifier model in the family of lean classifier models to generate new analysis results based on the normalized confidence value.

In a further aspect, the method may include generating a lean classifier model based on the full classifier model, and classifying the device behavior of the computing device based on the normalized confidence value may include applying a behavior vector information structure to the lean classifier model to generate analysis results, and using the analysis results and the normalized confidence value to determine whether the device behavior is benign or non-benign. In a further aspect, generating the lean classifier model based on based on the full classifier model may include generating a list of boosted decision stumps by converting a finite state machine included in the full classifier model into a plurality of boosted decision stumps, determining a number of unique test conditions that should be evaluated to classify the device behavior without consuming an excessive amount of processing, memory, or energy resources of the computing device, generating a list of test conditions by sequentially traversing the list of boosted decision stumps and inserting a test condition associated with each sequentially traversed boosted decision stump into the list of test conditions until the list of test conditions includes the number of unique test conditions, and generating the lean classifier model to include only those boosted decision stumps that test one of a plurality of test conditions included in the list of test conditions.

In a further aspect, applying the behavior vector information structure to the lean classifier model to determine whether the device behavior of the computing device is non-benign may include applying collected behavior information included in the behavior vector information structure to each of a plurality of boosted decision stumps included in the lean classifier model, computing a weighted average of a result of applying the collected behavior information to each of the plurality of boosted decision stumps included in the lean classifier model, and comparing the weighted average to a threshold value.

In a further aspect, the method may include generating an updated sigmoid parameter based on the normalized confidence value, and sending the updated sigmoid parameter to the server computing device. In a further aspect, the method may include receiving an updated sigmoid parameter from the server computing device, determining a new normalized confidence value based on the updated sigmoid parameter received from the server computing device, and classifying the device behavior based on the new normalized confidence value. In a further aspect, receiving the full classifier model and the sigmoid parameters may include receiving a finite state machine that includes information suitable for expression as two or more boosted decision stumps that each include a weight value and a test condition that is associated with a probability value that identifies a likelihood that the test condition will enable the computing device to determine whether the device behavior is one of benign and non-benign.

Further aspects may include a computing device that includes means for receiving from a server computing device a full classifier model and sigmoid parameters, means for determining a normalized confidence value based on the sigmoid parameters, and means for classifying a device behavior based on the normalized confidence value. In an aspect, the computing device may include means for generating a list of boosted decision stumps by converting a finite state machine included in the full classifier model into boosted decision stumps, and means for generating a family of lean classifier models based on the boosted decision stumps included in the list of boosted decision stumps, in which means for classifying the device behavior based on the normalized confidence value includes means for applying a behavior vector information structure to a first lean classifier model in the family of lean classifier models to generate analysis results, and means for determining whether to apply the behavior vector information structure to a second lean classifier model in the family of lean classifier models to generate new analysis results based on the normalized confidence value.

In a further aspect, the computing device may include means for generating a lean classifier model based on the full classifier model, and in which means for classifying the device behavior based on the normalized confidence value includes means for applying a behavior vector information structure to the lean classifier model to generate analysis results, and means for using the analysis results and the normalized confidence value to determine whether the device behavior is benign or non-benign. In a further aspect, means for generating the lean classifier model based on based on the full classifier model may include means for generating a list of boosted decision stumps by converting a finite state machine included in the full classifier model into a plurality of boosted decision stumps, means for determining a number of unique test conditions that should be evaluated to classify the device behavior without consuming an excessive amount of processing, memory, or energy resources of the computing device, means for generating a list of test conditions by sequentially traversing the list of boosted decision stumps and inserting a test condition associated with each sequentially traversed boosted decision stump into the list of test conditions until the list of test conditions includes the number of unique test conditions, and means for generating the lean classifier model to include only those boosted decision stumps that test one of a plurality of test conditions included in the list of test conditions. In a further aspect, means for applying the behavior vector information structure to the lean classifier model to determine whether the device behavior is non-benign includes means for applying collected behavior information included in the behavior vector information structure to each of a plurality of boosted decision stumps included in the lean classifier model, means for computing a weighted average of a result of applying the collected behavior information to each of the plurality of boosted decision stumps included in the lean classifier model, and means for comparing the weighted average to a threshold value.

In a further aspect, the computing device may include means for generating an updated sigmoid parameter based on the normalized confidence value, and means for sending the updated sigmoid parameter to the server computing device. In a further aspect, the computing device may include means for receiving an updated sigmoid parameter from the server computing device, means for determining a new normalized confidence value based on the updated sigmoid parameter, and means for classifying the device behavior based on the new normalized confidence value. In a further aspect, means for receiving the full classifier model and the sigmoid parameters includes means for receiving a finite state machine that includes information suitable for expression as two or more boosted decision stumps that each include a weight value and a test condition that is associated with a probability value that identifies a likelihood that the test condition will enable the computing device to determine whether the device behavior is one of benign and non-benign.

Further aspects may include a computing device that includes a processor configured with processor-executable instructions to perform operations including receiving from a server computing device a full classifier model and sigmoid parameters, determining a normalized confidence value based on the sigmoid parameters, and classifying a device behavior based on the normalized confidence value. In an aspect, the processor may be configured with processor-executable instructions to perform operations further including generating a list of boosted decision stumps by converting a finite state machine included in the full classifier model into boosted decision stumps, and generating a family of lean classifier models based on the boosted decision stumps included in the list of boosted decision stumps, and the processor may be configured with processor-executable instructions to perform operations such that classifying the device behavior based on the normalized confidence value includes applying a behavior vector information structure to a first lean classifier model in the family of lean classifier models to generate analysis results, and determining whether to apply the behavior vector information structure to a second lean classifier model in the family of lean classifier models to generate new analysis results based on the normalized confidence value.

In a further aspect, the processor may be configured with processor-executable instructions to perform operations further including generating a lean classifier model based on the full classifier model, and the processor may be configured with processor-executable instructions to perform operations such that classifying the device behavior based on the normalized confidence value includes applying a behavior vector information structure to the lean classifier model to generate analysis results, and using the analysis results and the normalized confidence value to determine whether the device behavior is benign or non-benign.

In a further aspect, the processor may be configured with processor-executable instructions to perform operations such that generating the lean classifier model based on based on the full classifier model includes generating a list of boosted decision stumps by converting a finite state machine included in the full classifier model into a plurality of boosted decision stumps, determining a number of unique test conditions that should be evaluated to classify the device behavior without consuming an excessive amount of processing, memory, or energy resources of the computing device, generating a list of test conditions by sequentially traversing the list of boosted decision stumps and inserting a test condition associated with each sequentially traversed boosted decision stump into the list of test conditions until the list of test conditions includes the number of unique test conditions, and generating the lean classifier model to include only those boosted decision stumps that test one of a plurality of test conditions included in the list of test conditions.

In a further aspect, the processor may be configured with processor-executable instructions to perform operations such that applying the behavior vector information structure to the lean classifier model to determine whether the device behavior is non-benign includes applying collected behavior information included in the behavior vector information structure to each of a plurality of boosted decision stumps included in the lean classifier model, computing a weighted average of a result of applying the collected behavior information to each of the plurality of boosted decision stumps included in the lean classifier model, and comparing the weighted average to a threshold value. In a further aspect, the processor may be configured with processor-executable instructions to perform operations further including generating an updated sigmoid parameter based on the normalized confidence value, and sending the updated sigmoid parameter to the server computing device.

In a further aspect, the processor may be configured with processor-executable instructions to perform operations further including receiving an updated sigmoid parameter from the server computing device, determining a new normalized confidence value based on the updated sigmoid parameter, and classifying the device behavior based on the new normalized confidence value. In a further aspect, the processor may be configured with processor-executable instructions to perform operations such that receiving the full classifier model and the sigmoid parameters includes receiving a finite state machine that includes information suitable for expression as two or more boosted decision stumps that each include a weight value and a test condition that is associated with a probability value that identifies a likelihood that the test condition will enable the computing device to determine whether the device behavior is one of benign and non-benign.

Further aspects may include a non-transitory computer readable storage medium having stored thereon processor-executable software instructions configured to cause a processor of a of a computing device to perform operations that may include receiving from a server computing device a full classifier model and sigmoid parameters, determining a normalized confidence value based on the sigmoid parameters, and classifying a device behavior based on the normalized confidence value. In an aspect, the stored processor-executable instructions may be configured to cause the processor to perform operations further including generating a list of boosted decision stumps by converting a finite state machine included in the full classifier model into boosted decision stumps, and generating a family of lean classifier models based on the boosted decision stumps included in the list of boosted decision stumps, in which classifying the device behavior based on the normalized confidence value includes applying a behavior vector information structure to a first lean classifier model in the family of lean classifier models to generate analysis results, and determining whether to apply the behavior vector information structure to a second lean classifier model in the family of lean classifier models to generate new analysis results based on the normalized confidence value.

In a further aspect, the stored processor-executable instructions may be configured to cause the processor to perform operations further including generating a lean classifier model based on the full classifier model, and the stored processor-executable instructions may be configured to cause the processor to perform operations such that classifying the device behavior based on the normalized confidence value includes applying a behavior vector information structure to the lean classifier model to generate analysis results, and using the analysis results and the normalized confidence value to determine whether the device behavior is benign or non-benign.

In a further aspect, the stored processor-executable instructions may be configured to cause the processor to perform operations such that generating the lean classifier model based on based on the full classifier model includes generating a list of boosted decision stumps by converting a finite state machine included in the full classifier model into a plurality of boosted decision stumps, determining a number of unique test conditions that should be evaluated to classify the device behavior without consuming an excessive amount of processing, memory, or energy resources of the computing device, generating a list of test conditions by sequentially traversing the list of boosted decision stumps and inserting a test condition associated with each sequentially traversed boosted decision stump into the list of test conditions until the list of test conditions includes the number of unique test conditions, and generating the lean classifier model to include only those boosted decision stumps that test one of a plurality of test conditions included in the list of test conditions.

In a further aspect, the stored processor-executable instructions may be configured to cause the processor to perform operations further including generating an updated sigmoid parameter based on the normalized confidence value, and sending the updated sigmoid parameter to the server computing device. In a further aspect, the stored processor-executable instructions may be configured to cause the processor to perform operations further including receiving an updated sigmoid parameter from the server computing device, determining a new normalized confidence value based on the updated sigmoid parameter, and classifying the device behavior based on the new normalized confidence value.

Further aspects include a mobile computing device having a processor configured with processor-executable instructions to perform operations of the methods described above.

Further aspects include a non-transitory computer readable storage medium having stored thereon processor-executable software instructions configured to cause a processor in a mobile device to perform operations of the methods described above.

Further aspects include a system, including a mobile device including a device processor, and a server configured with server-executable instructions to perform operations including receiving a corpus of information on mobile device behaviors, generating a finite state machine based on the corpus of information and to include data that is suitable for conversion into a plurality of boosted decision stumps that each includes a test condition and a weight value, and sending the finite state machine to the mobile device as a full classifier model. In an aspect, the device processor may be configured with processor-executable instructions to perform operations including receiving the full classifier model, generating a lean classifier model in the mobile device based on the received full classifier model, and using the lean classifier model to classify a behavior of the mobile device as being either benign or not benign.

In an aspect system, the device processor may be configured with processor-executable instructions to perform operations such that generating the lean classifier model based on the full classifier model includes converting the finite state machine included in the full classifier model into a list of boosted decision stumps, determining a number of unique test conditions that should be evaluated to classify the behavior of the mobile device without consuming an excessive amount of processing, memory, or energy resources of the mobile device, generating a list of test conditions by sequentially traversing the list of boosted decision stumps and inserting the test condition associated with each sequentially traversed boosted decision stump into the list of test conditions until the list of test conditions includes the determined number of unique test conditions, and generating the lean classifier model to include the boosted decision stumps included in the list of boosted decision stumps that test one of a plurality of test conditions included in the generated list of test conditions.

In an aspect system, the device processor may be configured with processor-executable instructions to perform operations such that using the lean classifier model to classify the behavior of the mobile device includes applying collected behavior information to each boosted decision stump in the lean classifier model, computing a weighted average of the results of applying the collected behavior information to each boosted decision stump in the lean classifier model, and comparing the weighted average to a threshold value. In an aspect system, the device processor may be configured with processor-executable instructions to perform operations such that generating the lean classifier model based on the full classifier model includes converting the finite state machine included in the full classifier model into a list of boosted decision stumps, and generating a family of lean classifier models based on the boosted decision stumps included in the list of boosted decision stumps, the family of lean classifier models including the lean classifier model and a plurality of additional lean classifier models, each of the plurality of additional lean classifier models including a different number of unique test conditions.

In an aspect system, the device processor may be configured with processor-executable instructions to perform operations such that generating the lean classifier model based on the full classifier model includes generating a plurality of lean classifier models that each includes a decision stump that tests a first condition using a different weight value and a different threshold value. In an aspect system, the device processor may be configured with processor-executable instructions to perform operations further including re-computing threshold values and weight values associated with the boosted decision stumps in the plurality of lean classifier models.

In an aspect system, the server may be configured with server-executable instructions to perform operations such that each of the plurality of test conditions are associated with a probability value that identifies a likelihood that its associated test condition will enable the mobile device to determine whether a mobile device behavior is benign. In an aspect system, the server may be configured with server-executable instructions to perform operations further including organizing the boosted decision stumps in the finite state machine based on probability values prior to sending the finite state machine to the mobile device as the full classifier model.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

DETAILED DESCRIPTION

Figure 1:
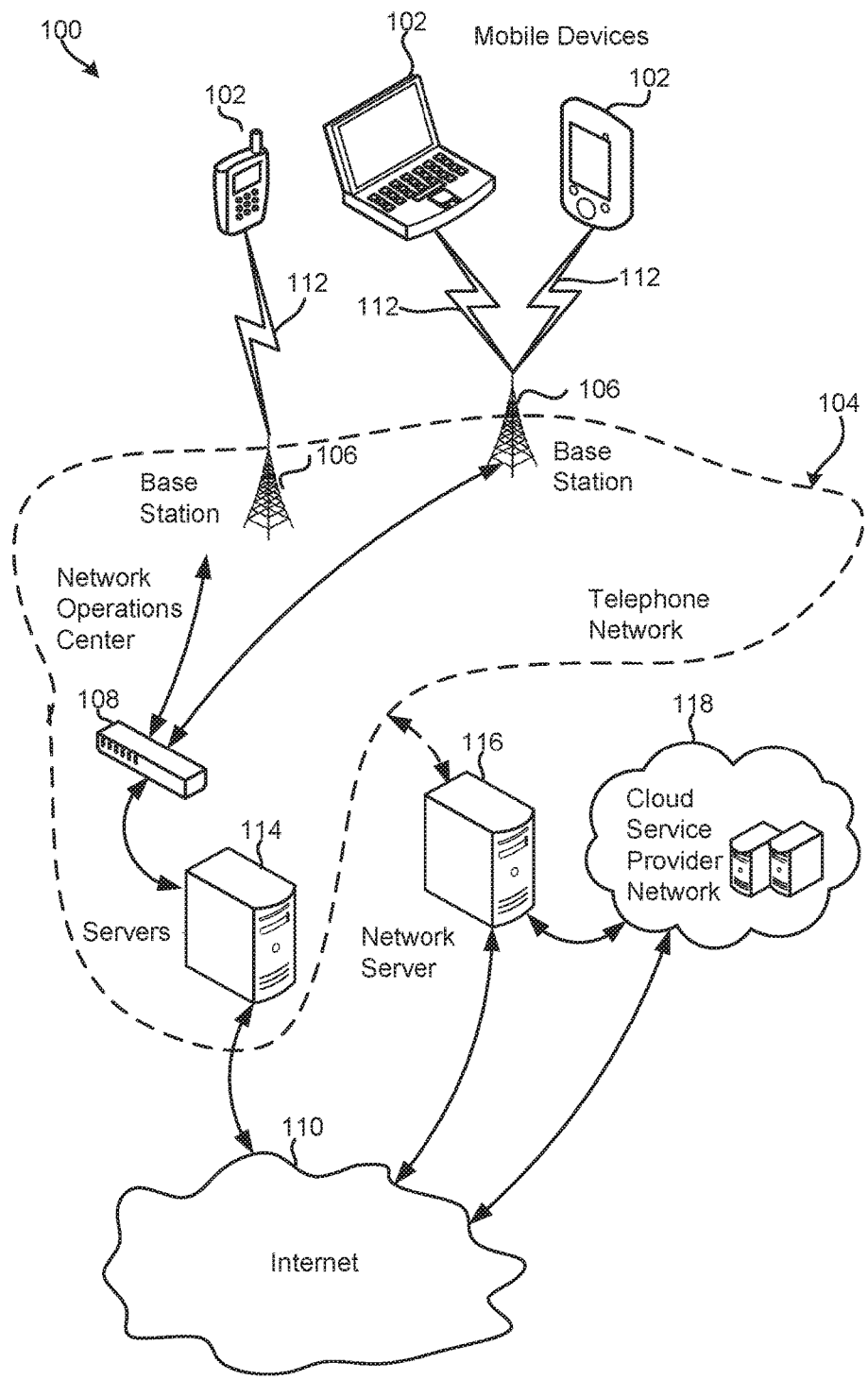
FIG. 1 is a communication system block diagram illustrating network components of an example telecommunication system that is suitable for use with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The word "exemplary" is used herein to mean "serving as an example, instance, or illustration." Any implementation described herein as "exemplary" is not necessarily to be construed as preferred or advantageous over other implementations.

In overview, the various aspects include network servers, mobile devices, systems, and methods for efficiently identifying, classifying, modeling, preventing, and/or correcting the conditions and/or mobile device behaviors that often degrade a mobile device's performance and/or power utilization levels over time. A network server may be configured to receive information on various conditions, features, behaviors and corrective actions from a central database (e.g., the "cloud"), and use this information to generate a full classifier model (i.e., a data or behavior model) that describes a large corpus of behavior information in a format or structure that can be quickly converted into one or more lean classifier models by a mobile device.

In an aspect, the full classifier model may be a finite state machine description or representation of the large corpus of behavior information. In an aspect, the finite state machine may include information that is suitable for expression as a plurality of boosted decision stumps. For example, the finite state machine may be an information structure that may be expressed as a family of boosted decision stumps that collectively identify, describe, test, or evaluate all or many of the features and data points that are relevant to determining whether a mobile device behavior is benign or contributing to that mobile device's degradation in performance over time. The network server may then send the full classifier model (i.e., information structure that includes the finite state machine and/or family of boosted decision stumps, etc.) to the mobile device.

The mobile device may be configured to receive and use the full classifier model to generate a lean classifier model or a family of lean classifier models of varying levels of complexity (or "leanness"). To accomplish this, the mobile device may cull the robust family of boosted decision stumps included in the full classifier model received from the network server (herein "full boosted decision stumps classifier model") to generate a lean classifier model that includes a reduced number of boosted decision stumps and/or evaluates a limited number of test conditions. This culling of the full boosted decision stumps classifier model may be accomplished by: selecting a boosted decision stump; identifying all other boosted decision stumps that depend upon the same mobile device state, feature, behavior, or condition as the selected decision stump (and thus can be applied based upon one determination result); including in the lean classifier model the selected and all identified other boosted decision stumps that depend upon the same mobile device state, feature, behavior, or condition; and repeating the process for a limited number of selected boosted decision stumps not already included in the lean classifier model. In this manner, a lean classifier model may be generated that includes all boosted decision stumps that depend upon a limited number of different mobile device states, features, behaviors, or conditions. The mobile device may then use this locally generated lean classifier model to quickly classify a mobile device behavior without consuming an excessive amount of its processing, memory, or energy resources.

In an aspect, the mobile device may perform the operations of culling the full boosted decision stumps classifier model a number of times using different numbers of different mobile device states, features, behaviors, or conditions in order to generate a family of lean classifier models of different degrees of leanness. The greater the number of different mobile device states, features, behaviors, or conditions used to create the lean classifier model, the more likely the model will accurately identify malicious or suspicious behavior, but the more processing power that will be consumed. Thus, in an aspect, the mobile device may be configured to apply the leanest of the family of lean classifier models (i.e., the model based on the fewest number of different mobile device states, features, behaviors, or conditions) routinely. If the results generated by the most lean classifier model are suspicious, the mobile device processor may apply a stronger (i.e., less lean) classifier model evaluating more device states, features, behaviors, or conditions to determine whether the behavior can identified as malicious or benign. If the results generated by applying that less lean classifier model are still suspicious, an even stronger (even less lean) classifier model may be applied, and so forth until the behavior is definitively classified as malicious or benign.

By storing information on such behaviors and corrective actions in a central database (e.g., the "cloud"), and configuring mobile devices and network servers to work in conjunction with one another to use the information stored in the central database to intelligently and efficiently identify the factors that are contributing to the degradation in performance and power utilization levels of each mobile device over time, the various aspects enable a mobile device to more accurately and efficiently identify and respond to performance-limiting and undesirable operating conditions of the mobile device.

In addition, by generating classifier models that include boosted decision stumps in the network server and sending these classifiers/models to the mobile device, the various aspects allow the mobile device to quickly and efficiently generate lean (or more focused) classifier models in the mobile device by culling the number of boosted decision stumps in the manner described above without accessing training data or further communicating with the network server, the central database, or the cloud network/server. This significantly reduces the mobile device's dependence on the network, and further improves the performance and power consumption characteristics of the mobile device.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Various other solutions exist for detecting malicious software by using machine learning techniques or modeling the behavior of processes or application programs executing on a computing device. However, many of these solutions are not suitable for use on mobile devices because they require evaluating a very large corpus of data, are limited to evaluating an individual application program or process, or require the execution of computationally-intensive processes in the mobile device. As such, implementing or performing such solutions in a mobile device may have a significant negative and/or user-perceivable impact on the responsiveness, performance, or power consumption characteristics of the mobile device. For these and other reasons, existing modeling and machine learning solutions are not well suited for use in the complex yet resource-constrained systems of modern mobile devices.

For example, an existing machine learning-based solution may include configuring a computing device to use a corpus of training data to derive a model that takes as input a feature vector. However, such a solution does not generate a full classifier model (or family of classifier models) that includes a finite state machine (or other similar information structure) that is suitable for conversion into or expression as a plurality of boosted decision stumps that each includes a test condition and a weight value. For at least this reason, such solutions cannot be used by a mobile device processor to quickly and efficiently generate a lean classifier model that includes a focused set of boosted decision stumps that be used to quickly and efficiently identify, analyze and/or classify mobile device behaviors without having a significant, negative, or user-perceivable impact on the responsiveness or performance or power consumption characteristics of the mobile device.

Mobile devices are resource constrained systems that have relatively limited processing, memory, and energy resources. Modern mobile devices are also complex systems, and it is often not feasible to evaluate all the various data flows, data operations (reads, writes, data encoding, data transmissions, etc.), processes, components, behaviors, or factors (or combinations thereof) that may be malicious or otherwise contribute to the performance degradation of the mobile device. For these and other reasons, it is increasingly difficult for users, operating systems, and/or application programs (e.g., anti-virus software, etc.) to accurately and efficiently identify the sources of problems and/or to provide adequate remedies to identified problems. As a result, mobile device users currently have few remedies for preventing the degradation in performance and power utilization levels of a mobile device over time.

The various aspects include network servers, mobile devices, systems, and methods for efficiently identifying, classifying, modeling, preventing, and/or correcting the conditions and/or mobile device behaviors that often degrade a mobile device's performance and/or power utilization levels over time.

In an aspect, an observer process, daemon, module, or sub-system (herein collectively referred to as a "module") of the mobile device may instrument or coordinate various APIs, registers, counters or other components (herein collectively "instrumented components") at various levels of the mobile device system. The observer module may continuously (or near continuously) monitor mobile device behaviors by collecting behavior information from the instrumented components. The mobile device may also include an analyzer module, and the observer module may communicate (e.g., via a memory write operation, function call, etc.) the collected behavior information to an analyzer module of the mobile device. The analyzer module may receive and use the behavior information to generate behavior vectors, generate spatial and/or temporal correlations based on the behavior vectors, and use this information to determine whether a particular mobile device behavior, sub-system, software application, or process is benign, suspicious, malicious, or performance-degrading.

The analyzer module may be configured to perform real-time behavior analysis operations, which may include performing, executing, and/or applying data, algorithms, classifiers or behavior models (herein collectively "classifier models") to the collected behavior information to determine whether a mobile device behavior is benign or not benign (e.g., malicious or performance-degrading). Each classifier model may be a behavior model that includes information that may be used by a mobile device processor to evaluate a specific aspect of a mobile device behavior. The classifier models may be preinstalled on the mobile device, downloaded, received from a network server, generated in the mobile device, or any combination thereof. A classifier model may be generated by using machine learning and other similar techniques.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes only the features/entries that are most relevant for determining whether a particular mobile device behavior is benign or not benign (e.g., malicious or performance-degrading).

As mentioned above, there may be thousands of features/factors and billions of data points that require analysis to properly identify the cause or source of a mobile device's degradation. Therefore, each classifier model used by the analyzer module must be trained on a very large number of features, factors, and data points in order for the mobile device to be able to make accurate decisions regarding whether a particular mobile device behavior is benign or not benign (e.g., malicious or performance-degrading). Yet, because mobile devices are resource constrained systems, it is often not feasible for the analyzer module to evaluate all these features, factors, and data points. Therefore, it is important for the analyzer module to apply lean classifier models that focus on evaluating a targeted subset of all the features, factors, and data points that would otherwise require analysis when classifying a mobile device behavior.

The various aspects include mobile devices and network servers configured to work in conjunction with one another to intelligently and efficiently identify the features, factors, and data points that are most relevant to determining whether a mobile device behavior is benign or not benign (e.g., malicious or performance-degrading). By generating classifier models that include boosted decision stumps in the network server and sending these classifiers/models to the mobile device, the various aspects allow the mobile device to quickly and efficiently generate lean classifier models in the mobile device.

In various aspects, the network server may be configured to receive a large amount of information regarding mobile device behaviors and states, features, and conditions during or characterizing those behaviors from a cloud service/network. This information may be in the form of a very large cloud corpus of mobile device behavior vectors. The network server may use this information to generate a full classifier model (i.e., a robust data/behavior model) that accurately describes the very large cloud corpus of behavior vectors. The network server may generate the full classifier model to include all or most of the features, data points, and/or factors that could contribute to the degradation over time of any of a number of different mobile devices.

In an aspect, the network server may generate the full classifier model to include a finite state machine expression or representation, such as a boosted decision stump or family of boosted decision stumps. This finite state machine expression or representation can be quickly and efficiently culled, modified or converted into lean classifier models that are suitable for use or execution in a mobile device through application of culling algorithms at the mobile device processor. The finite state machine expression or representation may be an information structure that includes test conditions, state information, state-transition rules, and other similar information. In an aspect, the finite state machine expression or representation may be an information structure that includes a large or robust family of boosted decision stumps that each evaluate or test a condition, feature, factor, or aspect of a behavior of the mobile device.

The mobile device may be configured to receive a full classifier model from the network server, and use the received full classifier model to generate lean classifier models (i.e., data/behavior models) locally in the mobile device. The mobile device may generate these local lean classifier models by culling a set of boosted decision stumps included in the received full classifier model into to a subset of boosted decision stumps that identify, test, evaluate and/or depend upon a reduced or limited number of different mobile device states, features, behaviors, or conditions. This culling of the full set of boosted decision stumps may be accomplished by: selecting a boosted decision stump; identifying all other boosted decision stumps that depend upon the same mobile device state, feature, behavior, or condition as the selected decision stump (and thus can be applied based upon one determination result); including in the lean classifier model the selected and all identified other boosted decision stumps that depend upon the same mobile device state, feature, behavior, or condition; and repeating the process for a reduced/limited number of selected boosted decision stumps not already included in the lean classifier model. By repeating the process using different numbers of mobile device states, features, behaviors, or conditions that are tested, a family of lean classifier models may be generated with varying degrees of leanness determined by the number of states, features, behaviors, or conditions that are evaluated. In addition, each of these lean classifier models may test or evaluate some or all of the same features or conditions as another lean classifier model, but using different threshold values and/or different weights assigned to the importance of the test results, features, or conditions evaluated. As such, the process of generating or regenerating the lean classifier models may include re-computing the threshold values and/or weights associated with the decision stumps.

Since these lean classifier models include a reduced subset of states, features, behaviors, or conditions that must be tested (compared to the full classifier model), the observer and/or analyzer modules may use them to quickly and accurately determine whether a mobile device behavior is benign or contributing to the degradation in the performance of the mobile device without consuming an excessive amount of processing, memory, or energy resources of the mobile device. As noted above, the leanest of the family of lean classifier models (i.e., the lean classifier model based on the fewest number of test conditions) may be applied routinely until a behavior is encountered that the model cannot categorize as either benign or malicious (and therefore is categorized by the model as suspicious), at which time a more robust (i.e., less lean) lean classifier model may be applied in an attempt to categorize the behavior as either benign or malicious. The application of ever more robust lean classifier models within the family of generated lean classifier models may be applied until a definitive classification of the behavior is achieved. In this manner, the observer and/or analyzer modules can strike a balance between efficiency and accuracy by limiting the use of the most complete, but resource-intensive lean classifier models to those situations where a robust classifier model is needed to definitively classify a behavior.

In various aspects, the mobile device may be configured to generate one or more lean classifier models by converting a finite state machine representation/expression into boosted decision stumps, culling the full set of boosted decision stumps included in the full classifier model to a subset or subsets of boosted decision stumps that depend upon a limited number of different mobile device states, features, behaviors, or conditions, and using the subset or subsets of boosted decision stumps to intelligently monitor, analyze and/or classify a mobile device behavior. The use of boosted decision stumps allows the observer and/or analyzer modules to generate and apply lean data models without communicating with the cloud or a network to re-train the data, which significantly reduces the mobile device's dependence on the network server and the cloud. This eliminates the feedback communications between the mobile device and the network server, which further improves the performance and power consumption characteristics of the mobile device.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the mobile device).

As described below, the network server (or another computing device) may generate a boosted decision stump-type full classifier model from another, more complex model of mobile device behaviors, such as a boosted decision tree model. Such complex models may correlate the full (or nearly full) set of interactions among device states, operations, and monitored nodes that characterize mobile device behavior in a sophisticated classification system. As mentioned above, the server or other computing device may generate a full, complex classifier model by applying machine learning techniques to generate models that describe a cloud corpus of behavior vectors of mobile devices collected from a large number of mobile devices. As an example, a boosted decision tree classifier model may trace hundreds of paths through decision nodes of testable conditions to arrive at a determination of whether a current mobile device behavior is malicious or benign. Such complex models may be generated in the server using a number of known learning and correlation modeling techniques. While such complex models can become quite effective in accurately recognizing malicious behaviors by learning from data from many hundreds of mobile devices, their application to a particular mobile device's configuration and behaviors may require significant processing, particularly if the model involves complex, multilevel decision trees. Since mobile devices are typically resource limited, using such models may impact device performance and battery life.

To render robust classifier models that are more conducive to use by mobile devices, a server (e.g., a cloud server or the network server) or another computing device (e.g., a mobile device or a computer that will couple to the mobile device) may transform complex classifier models into large boosted decision stump models. The more simple determinations involved in decision stumps and the ability to apply such classifier models in parallel processes may enable mobile devices to better benefit from the analyses performed by the network server. Also, as discussed below, a boosted decision stump full classifier model may be used by mobile devices to generate a lean classifier model using the aspect methods described below.

In an aspect, the server or other computing device that generates a boosted decision stump full classifier model may do so by following an aspect process described in more detail below. In summary, the server or other computing device may select a node within the full complex classifier model (e.g., a boosted decision tree model) and apply the model to determine the percentage of the time that the node is predictive of malicious behavior. In other words, the server or other computing device may select one branch of the node and follow all subsequent nodes and paths connected to that branch to determine the fraction of the time that branch leads to a determination of malicious behavior. In an aspect, this fraction of time may be used to compute a "weight" factor for the node. For example, a decision node with one branch whose subsequent path results in a malicious behavior conclusion 80% of the time might be associated with a weighting factor of 0.8, indicating that this single decision node is a reliable indicator of potentially malicious (and thus suspicious) behavior. As another example, a decision node in the complex classifier model whose branches may equally lead to a malicious behavior conclusion would provide little assistance in recognizing malicious behavior, and thus may be given a very low weighting factor or priority.

In the process of tracing the outcomes from each decision node, the server or other computing device may apply a variety of test conditions to each node if the decision node is not binary (i.e., "yes" or "no"). For example, a complex classifier model may accommodate a range of values (e.g., the number of SMS messages transmitted per minute), with the ultimate conclusion depending upon the value. However, ranges of values are inconsistent with the binary nature of decision stumps. So, the server or other computing device may develop a range of binary decisions or tests for such nodes that are conducive to conditions characterized by values. For example, the server or other computing device may generate and test through the complex classifier model a number of threshold tests or conditions, such as "more than one," "more than ten" and "more than 100." Such threshold tests may be identified or selected by the server based on conclusions it can reach from studying the complex model. Each such threshold-based test may then be treated as a single decision stump that can be tested to determine its predictive value and thus its boosting factor.

By following this process through all decision nodes in the complex classifier model, the server or other computing device can transform a complex multi-layered decision model into a single layer model of a large number of boosted decision stumps. The server or other computing device may then trim the model by removing decision stumps whose value is below a threshold value in order to remove test conditions that provide very little predictive or classification benefit (e.g., "is the power on?").

While the resulting number of such stumps may be large in a full classifier model, the binary nature of the stumps may facilitate their application, particularly in resource constrained processors. In an aspect, the server or other computing device may provide the boosted decision stumps full classifier model to mobile devices for their use.

The process of generating a large classifier model of boosted decision stumps may be generated by the cloud server that analyzes inputs from many mobile devices and generates a full, complex behavior classifier model, since such servers will have the processing resource and processing time to complete the analysis. However, as noted above, the aspect methods may also be performed by another computing device, including even the mobile device. In this aspect, a server (e.g., a cloud or network server) may deliver the full, complex behavior classifier model to the other computing device, which may then process the model as outline above and in more detail below to transform it into a boosted decision stumps model. For example, a person computer that the user couples to his/her mobile device may download the full, complex behavior classifier model and then perform the aspect methods to generate a large boosted decision stumps model that it makes available (e.g., through a wired or wireless data link) to the mobile device. As another example, a mobile device may download the full, complex behavior classifier model and then perform the aspect methods, such as during late night hours when the device is being charged and not in use, to generate a large boosted decision stumps model that it stores in memory. Since the processes implemented by a server or another computing device are very similar, the aspect methods are described in more detail below as being performed by a server. However, that description is for example purposes and is not intended to limit the aspect methods to being performed on a server unless specifically so recited in the claims.

In a further aspect, mobile devices may be configured to use a received or self-generated large classifier model of boosted decision stumps to build lean classifier models by selecting a limited number of factors that are tested in decision stumps, without accessing the training data and without consuming an excessive amount of processing, memory, or energy resources of the mobile device. The analyzer module may use the lean classifier model of selected boosted decision stumps to identify malware and classify device behavior as malicious or benign. As described more fully below, mobile devices may generate lean classifier models by determining a number of features to monitor that will be tested (e.g., 15), selecting a first feature and incorporating into the lean classifier all of boosted decision stumps that include a test of that feature (e.g., all stumps with threshold tests based on a value obtained from the monitored feature), and repeating this process until the number of features addressed in the lean classifier model is the determined number. It is worth noting that the number of boosted decision stumps in such a lean classifier model may be significantly larger than the number of features.

In an aspect, a mobile device may be configured to receive a full classifier model that includes a finite state machine that is suitable for conversion into a plurality of boosted decision stumps. The mobile device may generate a lean classifier model based on the full classifier model, which may be accomplished by converting the finite state machine of the full classifier model into boosted decision stumps and using these boosted decision stumps as a lean classifier model.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile devices 102 (e.g., cell phones, laptops, tablets, etc.)

and other network destinations, such as via telephone land lines (e.g., a POTS network, not shown) and the Internet 110. Communications between the mobile devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include network servers 116 connected to the telephone network 104 and to the Internet 110. The connection between the network server 116 and the telephone network 104 may be through the Internet 110 or through a private network (as illustrated by the dashed arrows). The network server 116 may also be implemented as a server within the network infrastructure of a cloud service provider network 118. Communication between the network server 116 and the mobile devices 102 may be achieved through the telephone network 104, the internet 110, private network (not illustrated), or any combination thereof.

The network server 116 may send lean data/behavior models to the mobile device 102, which may receive and use lean data/behavior models to identify suspicious or performance-degrading mobile device behaviors, software applications, processes, etc. The network server 116 may also send classification and modeling information to the mobile devices 102 to replace, update, create and/or maintain mobile device data/behavior models.

The mobile device 102 may collect behavioral, state, classification, modeling, success rate, and/or statistical information in the mobile device 102, and send the collected information to the network server 116 (e.g., via the telephone network 104) for analysis. The network server 116 may use information received from the mobile device 102 to update or refine the lean data/behavior models or the classification/modeling information to include a further targeted and/or reduced subset of features.

In an aspect, the mobile device 102 may be configured to use the collected behavioral, state, classification, modeling, success rate, and/or statistical information to generate, update or refine the lean classifier models (or data/behavior models) that include a further targeted and/or reduced subset of features in the mobile device 102. This reduces the amount of feedback communications between the mobile device and the network server 116, and improves the performance and power consumption characteristics of the mobile device 102.

Figure 2:
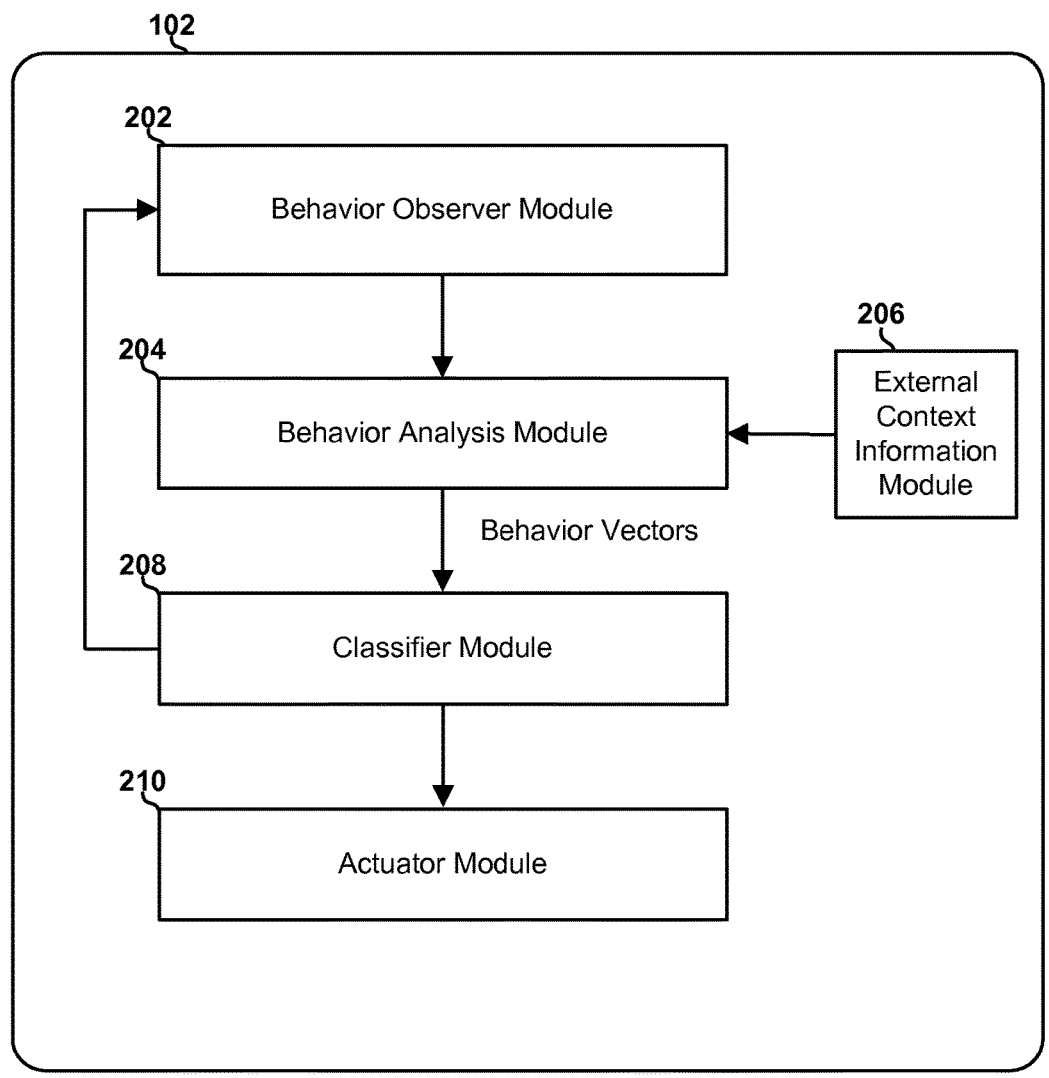
FIG. 2 is a block diagram illustrating example logical components and information flows in an aspect mobile device configured to determine whether a particular mobile device behavior is malicious, performance-degrading, suspicious, or benign.

FIG. 2 illustrates example logical components and information flows in an aspect mobile device 102 configured to determine whether a particular mobile device behavior, software application, or process is malicious/performance-degrading, suspicious, or benign. In the example illustrated in FIG. 2, the mobile device 102 includes a behavior observer module 202, a behavior analyzer module 204, an external context information module 206, a classifier module 208, and an actuator module 210. In an aspect, the classifier module 208 may be implemented as part of the behavior analyzer module 204. In an aspect, the behavior analyzer module 204 may be configured to generate one or more classifier modules 208, each of which may include one or more classifiers.

Each of the modules 202-210 may be implemented in software, hardware, or any combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the mobile device 102.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer module 204.

The behavior observer module 202 may monitor/observe mobile device operations and events by collecting information pertaining to library application programming interface (API) calls in an application framework or run-time libraries, system call APIs, file-system and networking subsystem operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

The behavior observer module 202 may also monitor/observe actions or operations of software applications, software downloads from an application download server (e.g., Apple® App Store server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The behavior observer module 202 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual/multiple subscriber identity module (SIM) cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments may include, detecting near-field communications (NFC), collecting information from a credit card scanner, barcode scanner, or mobile tag reader, detecting the presence of a universal serial bus (USB) power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

To reduce the number of factors monitored to a manageable level, in an aspect, the behavior observer module 202 may perform coarse observations by monitoring/observing an initial set of behaviors or factors that are a small subset of all factors that could contribute to the mobile device's degradation. In an aspect, the behavior observer module 202 may receive the initial set of behaviors and/or factors from a network server 116 and/or a component in a cloud service or network 118. In an aspect, the initial set of behaviors/factors may be specified in data/behavior models received from the network server 116 or cloud service/network 118. In an aspect, the initial set of behaviors/factors may be specified in a reduced feature model (RFMs).

The behavior analyzer module 204 and/or classifier module 208 may receive the observations from the behavior observer module 202, compare the received information (i.e., observations) with contextual information received from the external context information module 206, and identify subsystems, processes, and/or applications associated with the received observations that are contributing to (or are likely to contribute to) the device's degradation over time, or which may otherwise cause problems on the device.

In an aspect, the behavior analyzer module 204 and/or classifier module 208 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, external context information module 206, etc.), learn the normal operational behaviors of the mobile device, and generate one or more behavior vectors based the results of the comparisons. The behavior analyzer module 204 may send the generated behavior vectors to the classifier module 208 for further analysis.

The classifier module 208 may receive the behavior vectors and compare them to one or more behavior modules to determine whether a particular mobile device behavior, software application, or process is performance-degrading/malicious, benign, or suspicious.

When the classifier module 208 determines that a behavior, software application, or process is malicious or performance-degrading, the classifier module 208 may notify the actuator module 210, which may perform various actions or operations to correct mobile device behaviors determined to be malicious or performance-degrading and/or perform operations to heal, cure, isolate, or otherwise fix the identified problem.

When the classifier module 208 determines that a behavior, software application, or process is suspicious, the classifier module 208 may notify the behavior observer module 202, which may adjust the adjust the granularity of its observations (i.e., the level of detail at which mobile device behaviors are observed) and/or change the behaviors that are observed based on information received from the classifier module 208 (e.g., results of the real-time analysis operations), generate or collect new or additional behavior information, and send the new/additional information to the behavior analyzer module 204 and/or classifier module 208 for further analysis/classification. Such feedback communications between the behavior observer module 202 and the classifier module 208 enable the mobile device 102 to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communication also enable the mobile device 102 to adjust or modify the data/behavior models locally in the mobile device without consuming an excessive amount of the mobile device's processing, memory, or energy resources.

In an aspect, the behavior observer module 202 and the behavior analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer module 202 enables the mobile device 102 to efficiently identify and prevent problems from occurring on mobile devices without requiring a large amount of processor, memory, or battery resources on the device.

Figure 3:
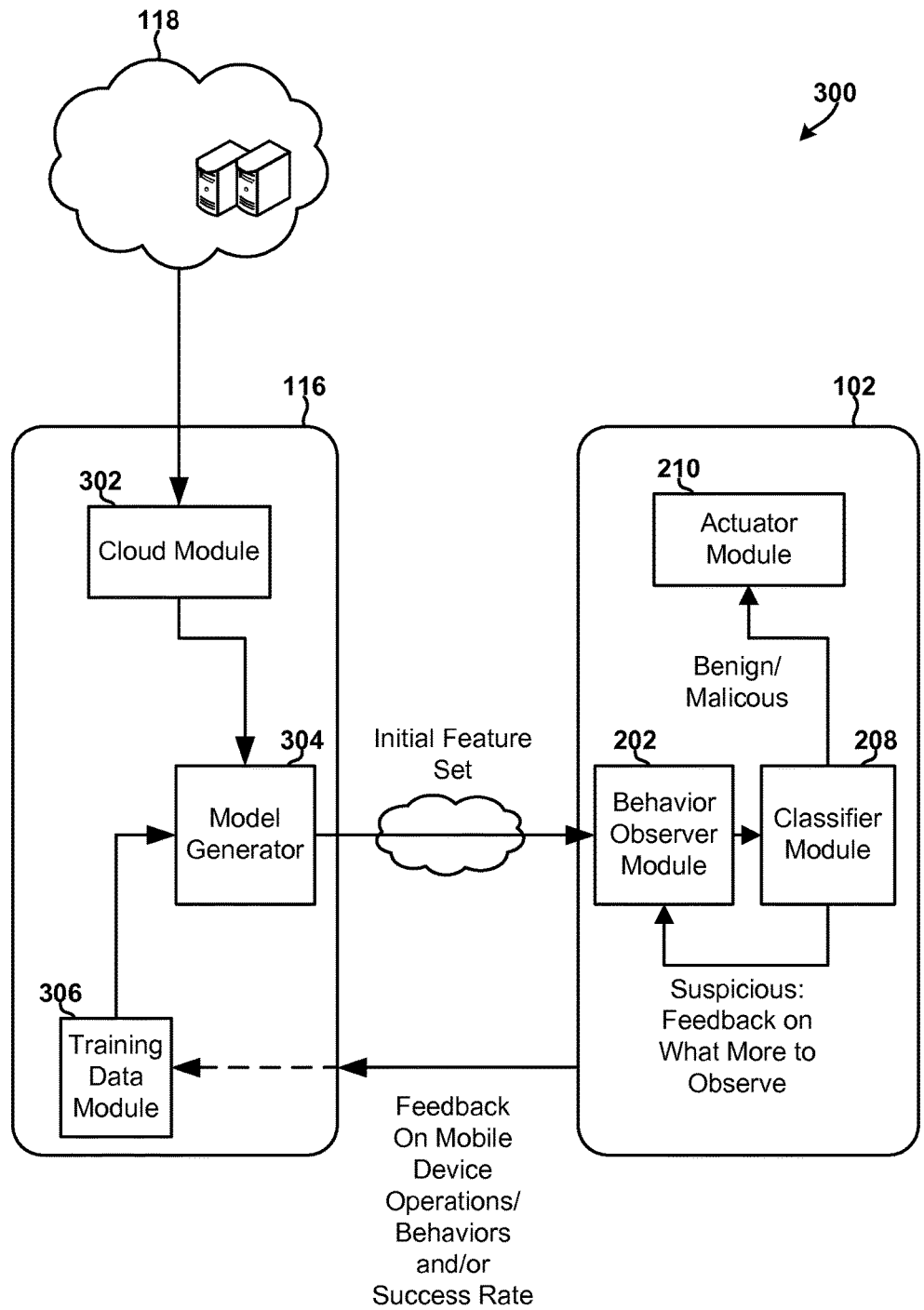
FIG. 3 is a block diagram illustrating example components and information flows in an aspect system that includes a network server configured to work in conjunction with a mobile device to determine whether a particular mobile device behavior is malicious, performance-degrading, suspicious, or benign.
Figure 4:
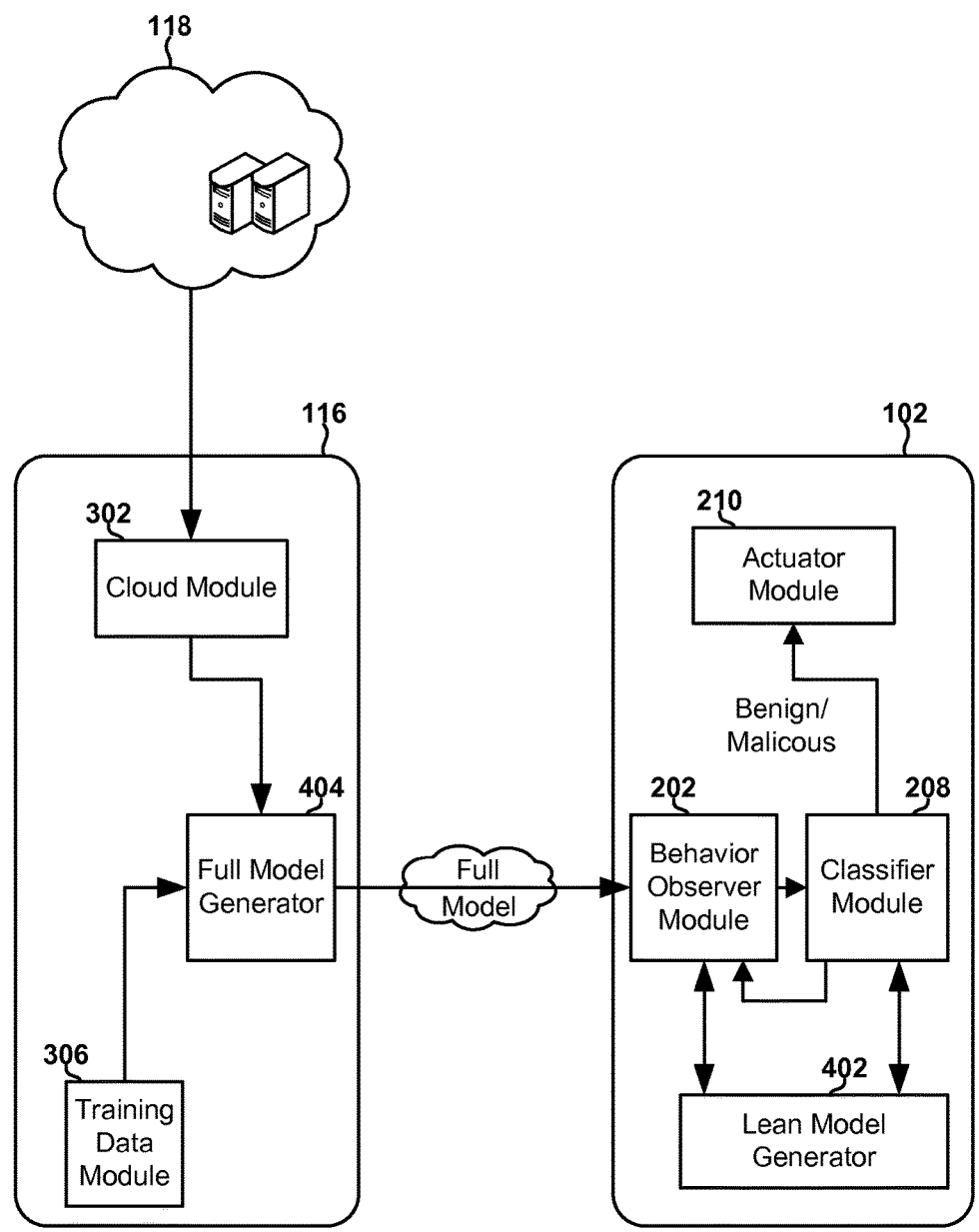
FIG. 4 is a block diagram illustrating example components and information flows in an aspect system that includes a mobile device configured to generate a targeted and lean classifier model from a full classifier model without re-training the data, behavior vectors or classifier models.

FIGS. 3 and 4 illustrate example components and information flows in an aspect system 300 that includes a network server 116 configured to work in conjunction with a cloud service/network 118 to intelligently and efficiently identify actively malicious or poorly written software applications and/or suspicious or performance-degrading mobile device behaviors on the mobile device 102 without consuming an excessive amount of processing, memory, or energy resources of the mobile device. In the example illustrated in FIG. 3, the network server 116 includes a cloud module 302, a model generator 304 module, and a training data module 306. The mobile device 102 includes a behavior observer module 202, a classifier module 208, and an actuator module 210. In an aspect, the classifier module 208 may be included in, or as part of, the behavior analyzer module 204 (illustrated in FIG. 2). In an aspect, the model generator 304 module may be a real-time online classifier.

The cloud module 302 may be configured to receive a large amount of information from a cloud service/network 118 and generate a full or robust data/behavior model that includes all or most of the features, data points, and/or factors that could contribute to the mobile device's degradation over time.

The model generator 304 module may be configured to generate lean data/behavior models based on full model generated in the cloud module 302. In an aspect, generating the lean data/behavior models may include generating one or more reduced feature models (RFMs) that include a subset of the features and data points included in the full model generated by the cloud module 302. In an aspect, the model generator 304 may generate a lean data/behavior model that includes an initial feature set (e.g., an initial reduced feature model) that includes information determined to have a highest probability of enabling the classifier module 208 to conclusively determine whether a particular mobile device behavior is benign or malicious/performance-degrading. The model generator 304 may send the generated lean models to the behavior observer module 202.

The behavior observer module 202 may monitor/observe mobile device behaviors based on the received model, generate observations, and send the observations to the classifier module 208. The classifier module 208 may perform real-time analysis operations, which may include applying data/behavior models to behavior information collected by the behavior observer module 202 to determine whether a mobile device behavior is benign, suspicious, or malicious/performance-degrading. The classifier module 208 may determine that a mobile device behavior is suspicious when the classifier module 208 does not have sufficient information to classify or conclusively determine that the behavior is either benign or malicious.

The classifier module 208 may be configured to communicate the results of its real-time analysis operations to the behavior observer module 202 when the classifier module 208 determines that a device behavior is suspicious. The behavior observer module 202 may adjust the granularity of its observations (i.e., the level of detail at which mobile device behaviors are observed) and/or change the behaviors that are observed based on information received from the classifier module 208 (e.g., based on the results of the real-time analysis operations), generate or collect new or additional behavior information, and send the new/additional information to the classifier module for further analysis/classification (e.g., in the form of new models). In this manner, the mobile device 102 may recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity.

The mobile device 102 may the send the results of its operations and/or success rates associated with the application of models to the network server 116. The network server 116 may generate training data (e.g., via the training data module 306) based on the results/success rates for use by the model generator 304. The model generator may generate updated models based on the training data, and send the updated models to the mobile device 102.

In the example illustrated in FIG. 4, there is no feedback communications between the mobile device 102 and the network server 116. Rather, the mobile device 102 includes a lean model generator module 402 configured to generate focused/targeted behavior models or classifiers based on the full or more robust models generated in the full model generator 404 and received from the network server 116. That is, the network server 116 may be configured to send the full classifier models to the mobile device 102, and the mobile device 102 may be configured to generate lean classifier models based on the full classifier model. This may be accomplished without consuming an excessive amount of the processing or battery resources of the mobile device due to the use (or inclusion) of boosted decision stumps in the classifier models. That is, by generating classifier models that include boosted decision stumps in the network server 116 and sending these classifiers/models to the mobile device 102, the various aspects allow the lean model generator module 402 to quickly and efficiently generate lean (or more focused) classifier models in the mobile device 102 by culling the number of boosted decision stumps included in the full classifier model without accessing training data or further communicating with the network server 116 or the cloud network/server 118. This significantly reduces the mobile device's dependence on network communications, and further improves the performance and power consumption characteristics of the mobile device 102.

Figure 5A:
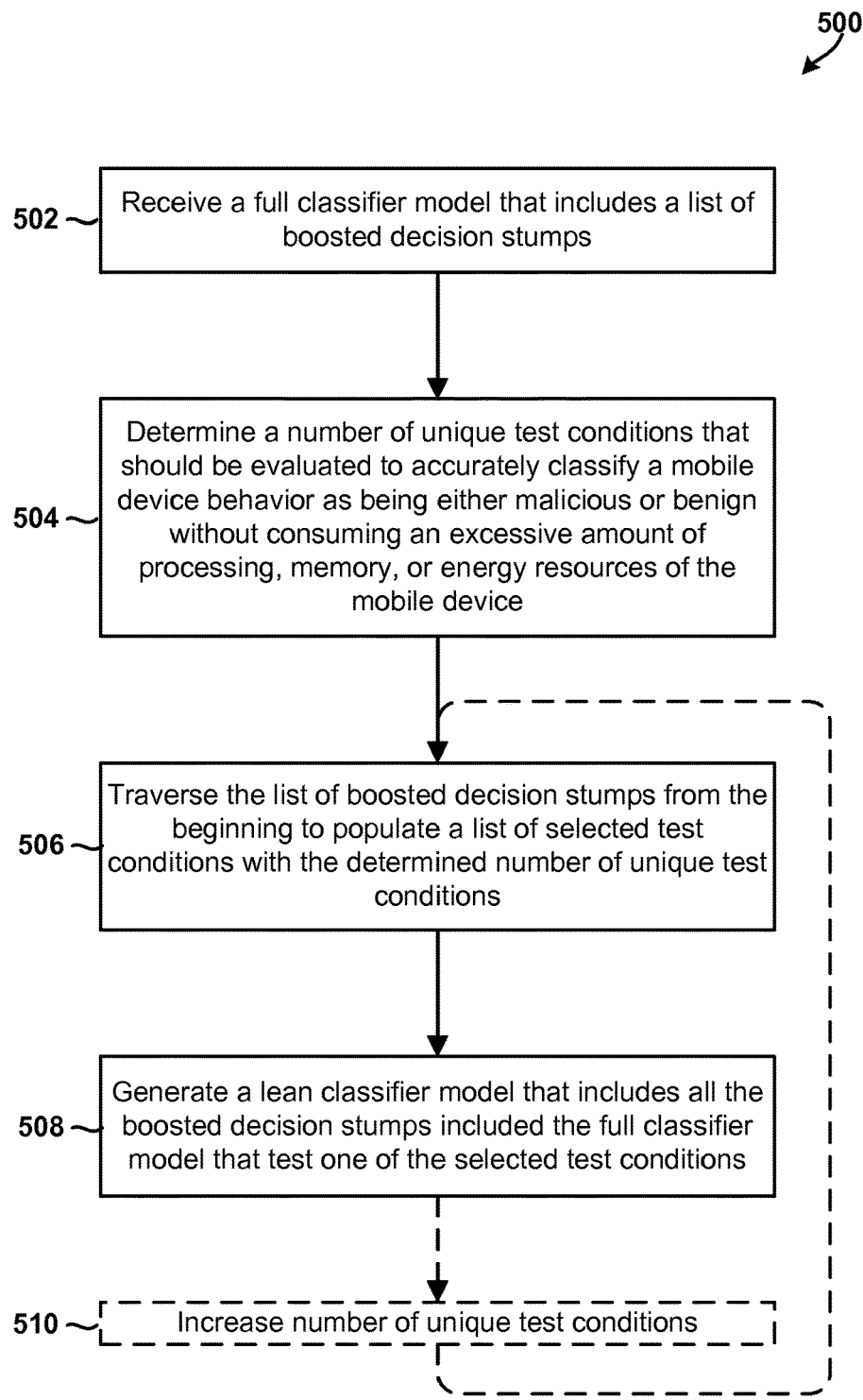
FIG. 5A is a process flow diagram illustrating an aspect mobile device method of generating in the mobile device a lean classifier model that includes a subset of the features and data points included in a full classifier model received from a network server.

FIG. 5A illustrates an aspect method 500 of generating a lean or focused classifier/behavior model in the mobile device (e.g., model generated in the model generator module 402, etc.). Method 500 may be performed by a processing core in a mobile device.

In block 502 of method 500, the processing core may receive a full classifier model that is or includes a finite state machine, a list of boosted decision stumps or other similar information structure. In an aspect, the full classifier model includes a finite state machine that includes information suitable for expressing plurality of boosted decision stumps and/or which include information that is suitable for conversion by the mobile device into a plurality of boosted decision stumps. In an aspect, the finite state machine may be (or may include) an ordered or prioritized list of boosted decision stumps. Each of the boosted decision stumps may include a test condition and a weight value.

As discussed above, boosted decision stumps are one level decision trees that have exactly one node (and thus one test question or test condition) and a weight value, and thus are well suited for use in a binary classification of data/behaviors. This means that applying a feature vector or behavior vector to boosted decision stump results in a binary answer (e.g., Yes or No). For example, if the question/condition tested by a boosted decision stump is "is the frequency of SMS transmissions less than x per min," applying a value of "3" to the boosted decision stump will result in either a "yes" answer (for "less than 3" SMS transmissions) or a "no" answer (for "3 or more" SMS transmissions).

Returning to FIG. 5A, in block 504 of method 500, the processing core may determine the number unique test conditions that should be evaluated to accurately classify a mobile device behavior as being either malicious or benign without consuming an excessive amount of processing, memory, or energy resources of the mobile device. This may include determining an amount of processing, memory, and/or energy resources available in the mobile device, the amount processing, memory, or energy resources of the mobile device that are required to test a condition, determining a priority and/or a complexity associated with a behavior or condition that is to be analyzed or evaluated in the mobile device by testing the condition, and selecting/determining the number of unique test conditions so as to strike a balance or tradeoff between the consumption of available processing, memory, or energy resources of the mobile device, the accuracy of the behavior classification that is to be achieved from testing the condition, and the importance or priority of the behavior that is tested by the condition.

In block 506, the processing core may traverse the list of boosted decision stumps from the beginning to populate a list of selected test conditions with the determined number of unique test conditions. In an aspect, the processing core may also determine an absolute or relative priority value for each of the selected test conditions, and store the absolute or relative priorities value in association with their corresponding test conditions in the list of selected test conditions.

In block 508, the processing core may generate a lean classifier model that includes all the boosted decision stumps included in the full classifier model that test one of the selected test conditions. In an aspect, the processing core may generate the lean classifier model to include or express the boosted decision stumps in order of importance or priority value.

In optional block 510, the number of unique test conditions may be increased in order to generate another more robust (i.e., less lean) lean classifier model by repeating the operations of traversing the list of boosted decision stumps for a larger number test conditions in block 506 and generating another lean classifier model in block 508. These operations may be repeated to generate a family of lean classifier models.

Figure 5B:
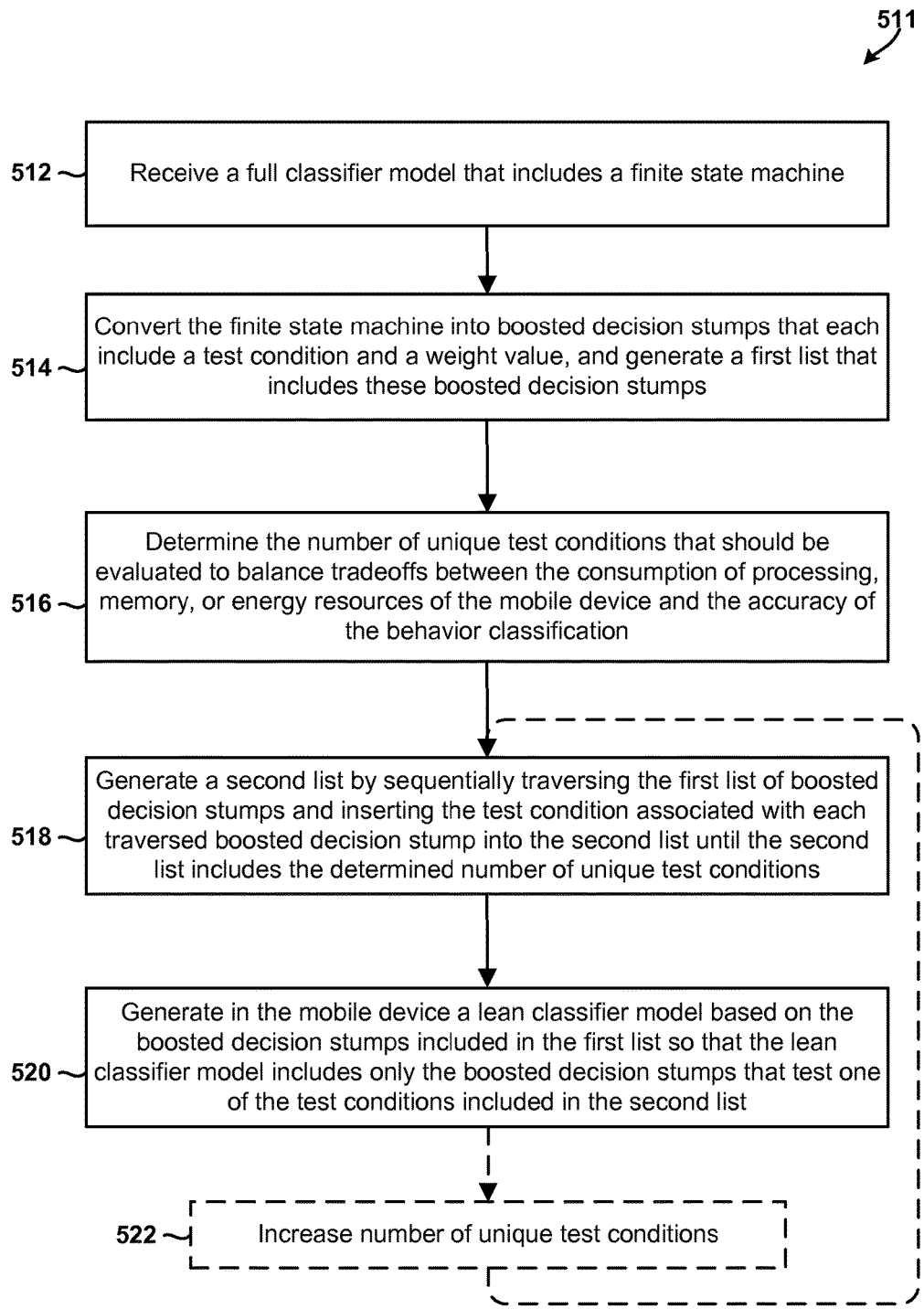
FIG. 5B is a process flow diagram illustrating another aspect mobile device method of generating a lean classifier model locally in the mobile device.

FIG. 5B illustrates another aspect method 511 of generating data models in the mobile device. Method 511 may be performed by a processing core in a mobile device. In block 512 of method 511, the processing core may receive a full classifier model that includes a finite state machine. The finite state machine may be an information structure that includes information that is suitable for conversion into a plurality of boosted decision stumps. In block 514, the processing core may convert the finite state machine included in the full classifier model into boosted decision stumps that include a test condition and a weight value.

In an aspect, the processing core may also compute or determine priority values for each of the boosted decision stumps that are generated from the finite state machine in block 512. The processing core may determine the priorities of the boosted decision stumps so as to balance tradeoffs between the consumption of processing, memory, or energy resources of the mobile device, the accuracy of the behavior classification, etc. The processing core may also determine the priorities of the boosted decision stumps based on their associated weight values, relative or predicted importance of the test conditions to accurately classify a behavior, etc.

Also in block 512, the processing core may generate a first list (or other information structure) that includes, references, identifies, and/or organizes the boosted decision stumps generated from the finite state machine in accordance with their priorities and/or in order of their importance. For example, the processing core may generate the first list to be an ordered list that includes the stump having the highest priority as the first item, followed by the stump having the second highest priority value, and so on. This order of importance may also take into account the information gathered from the cloud corpus, as well as information specific to the device on which the culling algorithm is being executed.

In block 516, the processing core may compute or determine the number of unique test conditions (i.e., the mobile device states, features, behaviors, or conditions that may be tested in boosted decision stumps) that should be evaluated when applying the lean classifier model. Computing or determining this number of unique test conditions may involve striking a balance or tradeoff between the consumption of processing, memory, or energy resources of the mobile device required to apply the model, and the accuracy of the behavior classification that is to be achieved the lean classifier model. Such a determination may include determining an amount of processing, memory, and/or energy resources available in the mobile device, determining a priority and/or a complexity associated with the behavior that is to be analyzed, and balancing the available resources with the priority and/or complexity of the behavior.

In block 518, the processing core may generate a second list by sequentially traversing the first list of boosted decision stumps and inserting the test condition values associated with each traversed boosted decision stump into the second list. The processing core may continue to traverse the first list and insert values into the second list until the length of second list is equal to the determined number of unique test conditions or until the second list includes all the determined number of unique test conditions.

In block 520, the processing core may generate a lean classifier model based on the boosted decision stumps included in the first list. In an aspect, the processing core may generate the lean classifier model to include only the boosted decision stumps that test one of the test conditions included in the second list (i.e., the list of test conditions generated in block 518).

In optional block 522, the number of unique test conditions may be increased in order to generate another more robust (i.e., less lean) lean classifier model by repeating the operations of traversing the list of boosted decision stumps for a larger number test conditions in block 518 and generating another lean classifier model in block 520. These operations may be repeated to generate a family of lean classifier models.

Figure 5C:
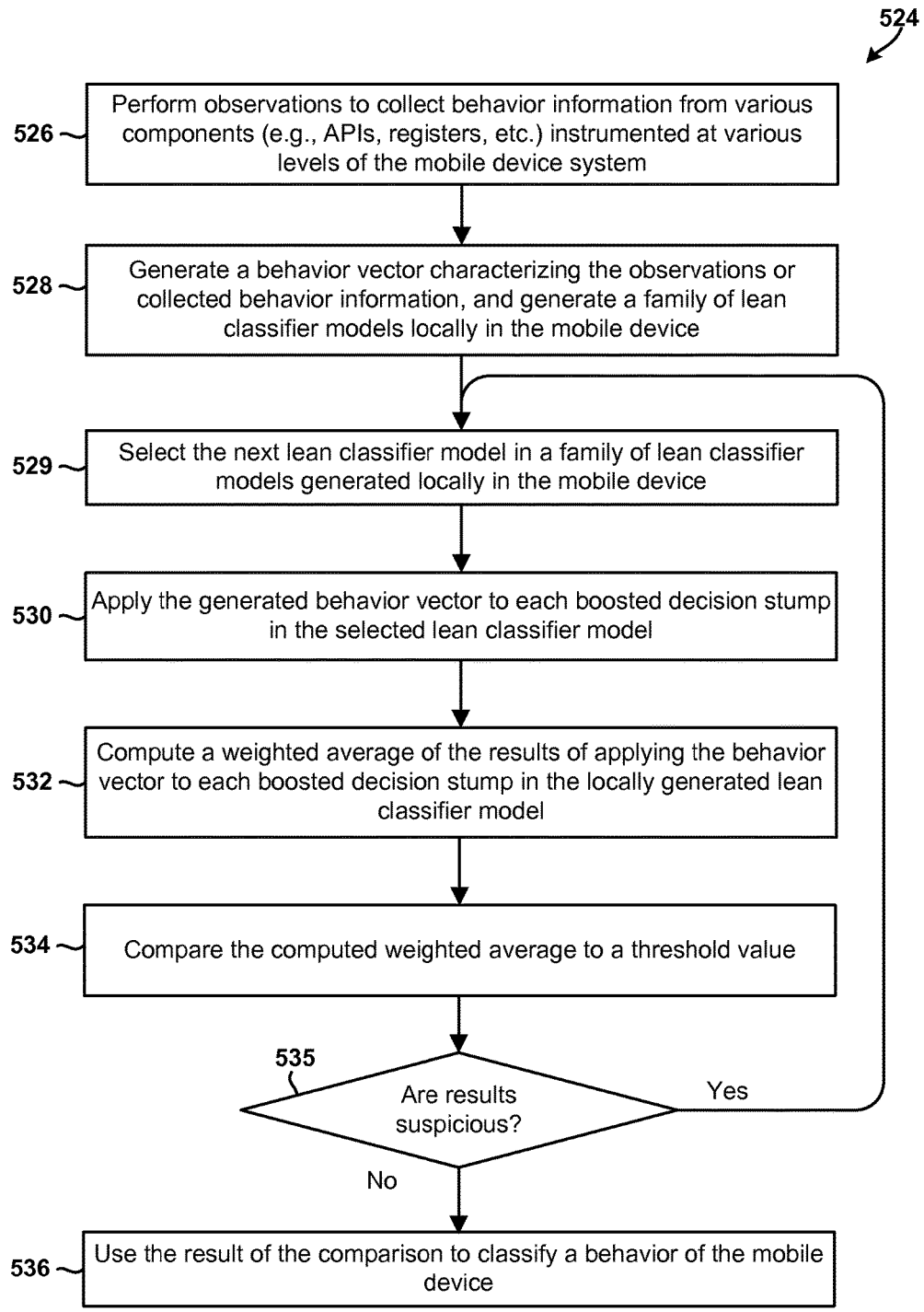
FIG. 5C is a process flow diagram illustrating an aspect mobile device method of using a locally generated lean classifier model to classify a behavior of the mobile device.

FIG. 5C illustrates an aspect method 524 of using a lean classifier model to classify a behavior of the mobile device. Method 524 may be performed by a processing core in a mobile device.

In block 526 of method 524, the processing core my perform observations to collect behavior information from various components that are instrumented at various levels of the mobile device system. In an aspect, this may be accomplished via the behavior observer module 202 discussed above with reference to FIG. 2. In block 528, the processing core may generate a behavior vector characterizing the observations, the collected behavior information, and/or a mobile device behavior. Also in block 528, the processing core may use a full classifier model received from a network server to generate a lean classifier model or a family of lean classifier models of varying levels of complexity (or "leanness"). To accomplish this, the processing core may cull a family of boosted decision stumps included in the full classifier model to generate lean classifier models that include a reduced number of boosted decision stumps and/or evaluate a limited number of test conditions.

In block 529, the processing core may select the leanest classifier in the family of lean classifier models (i.e., the model based on the fewest number of different mobile device states, features, behaviors, or conditions) that has not yet been evaluated or applied by the mobile device. In an aspect, this may be accomplished by the processing core selecting the first classifier model in an ordered list of classifier models.

In block 530, the processing core may apply collected behavior information or behavior vectors to each boosted decision stump in the selected lean classifier model. Because boosted decision stumps are binary decisions and the lean classifier model is generated by selecting many binary decisions that are based on the same test condition, the process of applying a behavior vector to the boosted decision stumps in the lean classifier model may be performed in a parallel operation. Alternatively, the behavior vector applied in block 530 may be truncated or filtered to just include the limited number of test condition parameters included in the lean classifier model, thereby further reducing the computational effort in applying the model.

In block 532, the processing core may compute or determine a weighted average of the results of applying the collected behavior information to each boosted decision stump in the lean classifier model. In block 534, the processing core may compare the computed weighted average to a threshold value. In determination block 535, the processing core may determine whether the results of this comparison and/or the results generated by applying the selected lean classifier model are suspicious. For example, the processing core may determine whether these results may be used to classify a behavior as either malicious or benign with a high degree of confidence, and if not treat the behavior as suspicious.

If the processing core determines that the results are suspicious (e.g., determination block 535="Yes"), the processing core may repeat the operations in blocks 529-534 to select and apply a stronger (i.e., less lean) classifier model that evaluates more device states, features, behaviors, or conditions until the behavior is classified as malicious or benign with a high degree of confidence. If the processing core determines that the results are not suspicious (e.g., determination block 535="No"), such as by determining that the behavior can be classified as either malicious or benign with a high degree of confidence, in block 536, the processing core may use the result of the comparison generated in block 534 to classify a behavior of the mobile device as benign or potentially malicious.

Figure 5D:
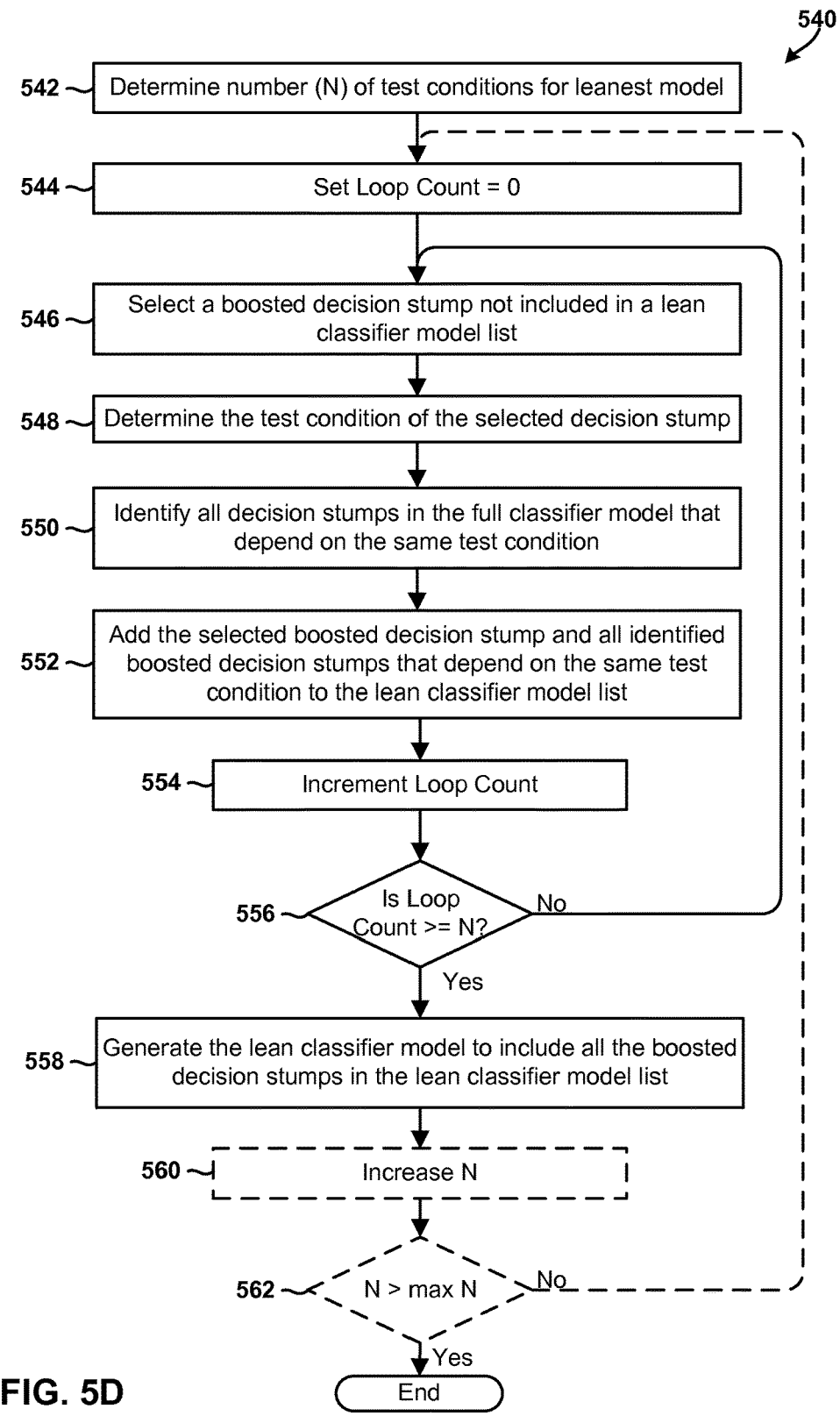
FIG. 5D is a process flow diagram illustrating yet another aspect mobile device method of generating a lean classifier model in the mobile device.

In an alternative aspect method 540 illustrated in FIG. 5D the operations described above with reference to blocks 518 and 520 may be accomplished by sequentially selecting a boosted decision stump that is not already in the lean classifier model; identifying all other boosted decision stumps that depend upon the same mobile device state, feature, behavior, or condition as the selected decision stump (and thus can be applied based upon one determination result); including in the lean classifier model the selected and all identified other boosted decision stumps that that depend upon the same mobile device state, feature, behavior, or condition; and repeating the process for a number of times equal to the determined number of test conditions. Because all boosted decision stumps that depend on the same test condition as the selected boosted decision stump are added to the lean classifier model each time, limiting the number of times this process is performed will limit the number of test conditions included in the lean classifier model.

Referring to FIG. 5D, in block 542, the processing core may compute or determine a number (N) of unique test conditions (i.e., the mobile device states, features, behaviors, or conditions that may be tested in boosted decision stumps) that should be evaluated in the lean classifier model. Computing or determining this number of unique test conditions may involve striking a balance or tradeoff between the consumption of processing, memory, or energy resources of the mobile device required to apply the model, and the accuracy of the behavior classification that is to be achieved by the lean classifier model. Such a determination may include determining an amount of processing, memory, and/or energy resources available in the mobile device, determining a priority and/or a complexity associated with the behavior that is to be analyzed, and balancing the available resources with the priority and/or complexity of the behavior.

In block 544, the processing core may set the value of a loop count variable to be equal to zero (0), or otherwise initiate a loop that will be performed the determined number N times. In block 546, the processing core may select a boosted decision stump that is included in, or generated from, the full set of boosted decision stumps and which is not included in a lean classifier model list. The first time through the loop there will be no boosted decision stumps in the lean classifier model list, so the first boosted decision stump will be selected. As mentioned herein, the full classifier model may be configured so that the first boosted decision stump in the full set has the highest probability of recognizing malicious or benign behavior. In block 548, the processing core may determine the test condition associated with the selected decision stump. In block 550, the processing core may identify all of the decision stumps included in, or generated from, the full classifier model that depend on, include, or test the same test condition as the test condition of the selected decision stump. In block 552, the processing core may add the selected boosted decision stump and all of the identified boosted decision stumps that depend on, include, or test the same test condition to the lean classifier model list.

In block 554, the processing core may increment the value of the loop count variable. In determination block 556, the processing core may determine whether the value of the loop count variable is greater than or equal to the number N of unique test conditions determined in block 542. When the processing core determines that the value of the loop count variable is not greater than or equal to the number of unique test conditions (i.e., determination block 556="No"), the processing core may repeat the operations in blocks 546-554. When the processing core determines that the value of the loop count variable is greater than or equal to the number of unique test conditions (i.e., determination block 556="Yes"), in block 558, the processing core may generate the lean classifier model to include all the boosted decision stumps in the lean classifier model list.

This method 540 may be used a number of times to generate a family of lean classifier models of varying degrees of robustness or leanness by varying the number N of unique test conditions in the lean classifier model. For example, in optional block 560, the mobile device processor may increase the number N of unique test conditions determined in block 542 in order to generate another lean classifier model that incorporates more test conditions. In optional determination block 562, the processor may determine whether the increase number N exceeds a maximum number (max N) of test conditions. The maximum number of test conditions may be determined (e.g., by a developer, service provider, user or via an algorithm) based on a maximum performance penalty or resource investment desired for assessing difficult-to-classify behaviors. If the increased number N is less than the maximum number max N (i.e., determination block 562="No"), the operations of blocks 544 through 560 described above may be repeated to generate another lean classifier model. Once the maximum number of unique test conditions have been included in a lean classifier model (i.e., determination block 562="Yes"), the process of generating lean classifier models may end.

While FIGS. 5A, 5B and 5D describe generating a family of lean classifier models by repeating the entire process of traversing the full set of boosted decision stumps, a similar result may be achieved by beginning with a generated lean classifier model (i.e., a model generated in any of blocks 508, 520 and 558) and traversing the full set of boosted decision stumps for the added number of test conditions adding to that model boosted decision stumps depending on a test condition not already included in the generated lean classifier model.

Also, while FIGS. 5A, 5B and 5D describe generating a family of lean classifier models from leanest to most robust, the lean classifier models may also be generated from most robust to leanest simply by beginning with a maximum number of test conditions (e.g., N=max N) and decreasing the number each time.

Figure 6A:
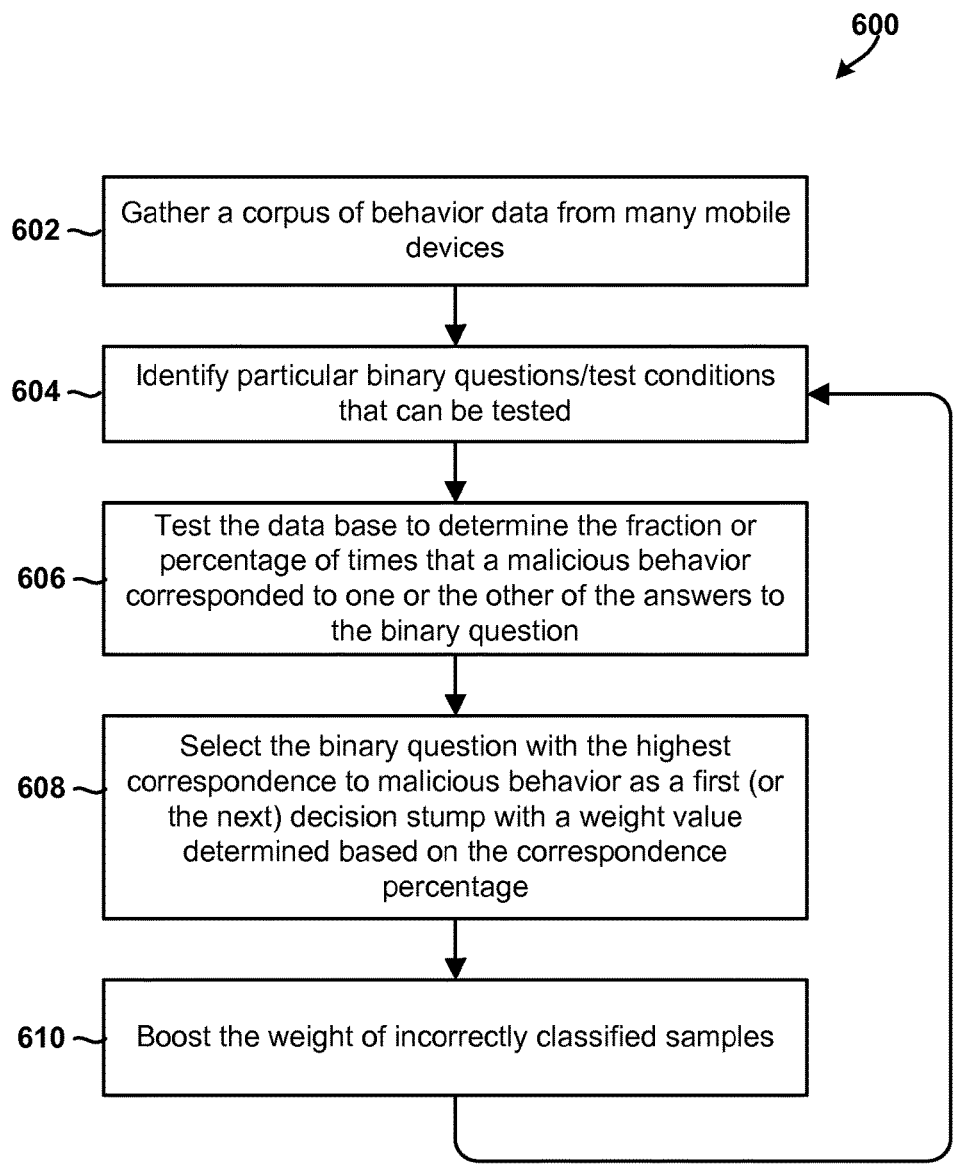
FIG. 6A is a process flow diagram illustrating an aspect network server method of generating in the network server a full classifier model that includes boosted decision stumps that are suitable for use by a mobile device in generating more focused and lean classifier models.

FIG. 6A illustrates an aspect method 600 of generating a full classifier in the server or cloud. Method 600 may be performed by a processing core in a server computing device coupled to the cloud network.

In block 602, the processing core may gather a corpus of behavior data from many mobile devices, including a large number of device states, configurations and behavior, as well as information regarding whether a malicious behavior was detected. In block 604, the processing core may identify particular binary questions/test conditions that can be tested within the device states, configurations and behavior from the corpus of behavior data. To characterize all of the device states, configurations and behaviors, a large number of such binary questions/test conditions will typically be identified. Then, in block 606, for each identified binary question, the processing core may test the data base to determine the fraction or percentage of times that a malicious behavior corresponded to one or the other of the answers to the binary question. In block 608, the processing core may select the binary question with the highest correspondence to malicious behavior as a first decision stump with a weight value determined based on the correspondence percentage. In block 610, the processing core may boost the weight of the incorrectly classified samples/test conditions as described below with reference to FIG. 6B.

The processing core of the server may then repeat the process of scanning the binary question assuming the answer of the first question is the value (e.g., "no") not associated with malicious behavior to identify the question with the highest correspondence to malicious behavior in this case. That question is then set as the second binary question in the model, with its weight value determined based on its correspondence percentage. The server then repeats the process of scanning the binary question—assuming the answers of the first and questions/test conditions are the values (e.g., "no") not associated with malicious behavior—to identify the next question/test condition with the highest correspondence to malicious behavior in this case. That question/test condition is then the third binary question/test condition in the model, with its weight value determined based on its correspondence percentage. This process is continued through all of the identified binary questions/test conditions to build the complete set.

In the process of generating the binary questions/test conditions, the server may evaluate data that has a range, such as the frequency of communications, or the number of communications within a previous time interval, and formulate a series of binary questions/test conditions that encompass the range in a manner that helps classify behaviors. Thus, one binary question/test condition might be whether the device has sent more than zero data transmissions within the previous five minutes (which might have a low correlation), a second binary question/test condition might be whether the device has sent more than 10 data transmissions in the previous five minutes (which might have a medium correlation), and a third question/test condition might be whether the device has sent more than 100 data transmissions within the previous five minutes (which might have a high correlation).

Some culling of the final set of questions/test conditions may be done by the server before the full classifier set is sent to mobile devices, such as to remove those questions/test conditions whose determined weight or correlation to malicious behavior is less than a threshold value (e.g., less than statistically significant). For example, if the correlation to malicious behavior is approximately 50/50, there may be little benefit in using that decision stump as neither answer helps answer the question of whether current behavior is malicious or benign.

Figure 6B:
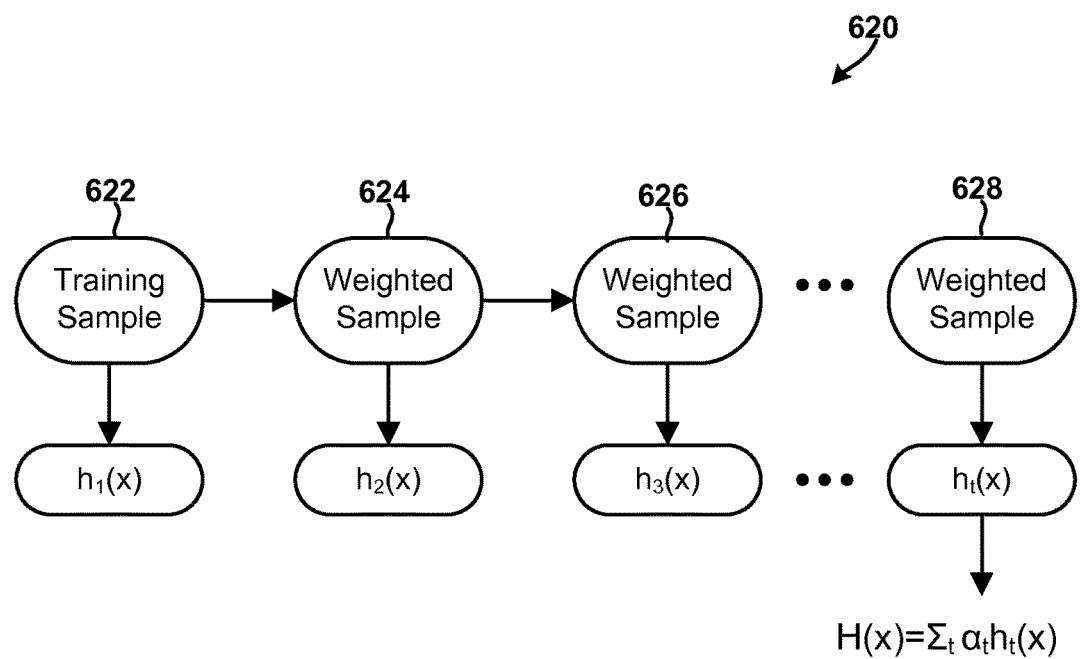
FIG. 6B is a process flow diagram illustrating an example method suitable for generating a boosted decision stump classifier in accordance with various aspects.

FIG. 6B illustrates an example boosting method 620 suitable for generating a boosted decision tree/classifier that is suitable for use in accordance with various aspects. In operation 622, a processor may generate and/or execute a decision tree/classifier, collect a training sample from the execution of the decision tree/classifier, and generate a new classifier model (h1(x)) based on the training sample. The training sample may include information collected from previous observations or analysis of mobile device behaviors, software applications, or processes in the mobile device. The training sample and/or new classifier model (h1(x)) may be generated based the types of question or test conditions included in previous classifiers and/or based on accuracy or performance characteristics collected from the execution/application of previous data/behavior models or classifiers in a classifier module 208 of a behavior analyzer module 204. In operation 624, the processor may boost (or increase) the weight of the entries that were misclassified by the generated decision tree/classifier (h1(x)) to generate a second new tree/classifier (h2(x)). In an aspect, the training sample and/or new classifier model (h2(x)) may be generated based on the mistake rate of a previous execution or use (h1(x)) of a classifier. In an aspect, the training sample and/or new classifier model (h2(x)) may be generated based on attributes determined to have that contributed to the mistake rate or the misclassification of data points in the previous execution or use of a classifier.

In an aspect, the misclassified entries may be weighted based on their relatively accuracy or effectiveness. In operation 626, the processor may boost (or increase) the weight of the entries that were misclassified by the generated second tree/classifier (h2(x)) to generate a third new tree/classifier (h3(x)). In operation 628, the operations of 624-626 may be repeated to generate "t" number of new tree/classifiers ($h_t(x)$).

By boosting or increasing the weight of the entries that were misclassified by the first decision tree/classifier (h1(x)), the second tree/classifier (h2(x)) may more accurately classify the entities that were misclassified by the first decision tree/classifier (h1(x)), but may also misclassify some of the entities that where correctly classified by the first decision tree/classifier (h1(x)). Similarly, the third tree/classifier (h3(x)) may more accurately classify the entities that were misclassified by the second decision tree/classifier (h2(x)) and misclassify some of the entities that where correctly classified by the second decision tree/classifier (h2(x)). That is, generating the family of tree/classifiers h1(x)-$h_t$(x) may not result in a system that converges as a whole, but results in a number of decision trees/classifiers that may be executed in parallel.

Figure 7:
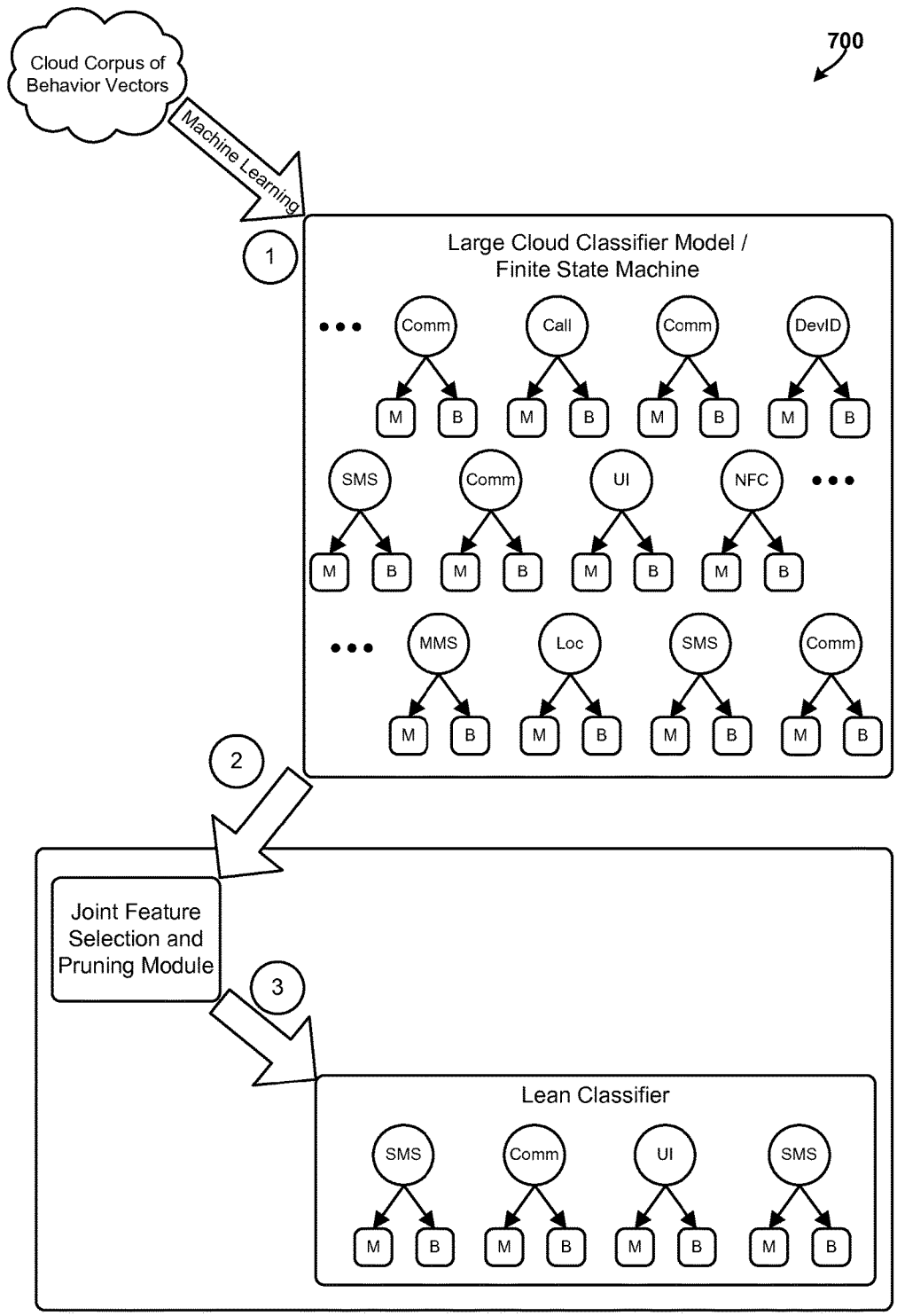
FIG. 7 is a process flow diagram of an example method of generating classifier models that include boosted decision stumps in accordance with an aspect.

FIG. 7 illustrates an example method 700 of generating classifier models that include boosted decision stumps and which may be used to intelligently and efficiently identifying actively malicious or poorly written software applications and/or suspicious or performance-degrading mobile device behaviors on the mobile device 102 without consuming an excessive amount of processing, memory, or energy resources of the mobile device. In operation 1 of method 700, an offline classifier in a network server may generate a full or robust classifier model based on information received from a cloud service/network. For example, the full classifier may include 100 boosted decision stumps that test forty (40) unique conditions. In operation 2 of method 700, the full classifier models may be sent to an analyzer/classifier module 208 in a mobile device 102. In operation 3 of method 700, the analyzer/classifier module 208 may generate a set of lean data/behavior models classifiers in the form of boosted decision stumps based on analyzing the full classifier model. This may be accomplished by performing "joint feature selection and culling" operations that allow the mobile device to: generate lean models on-the-fly without needing access to cloud training data; dynamically reconfigure the classifiers per application to enhance the classification accuracy; and to specify a deterministic complexity for each classifier (e.g., O(# of stumps)). The "joint feature selection and culling" operations may also include performing feature selection operations.

Figure 8:
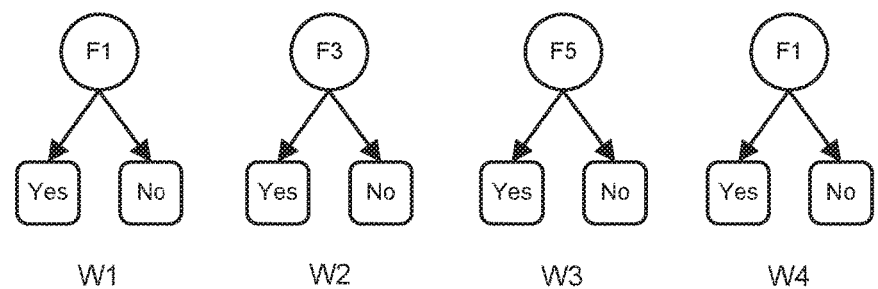
FIG. 8 is an illustration of example boosted decision stumps that may be generated by an aspect server processor and used by a mobile device processor to generate lean classifier models.
Figure 8:
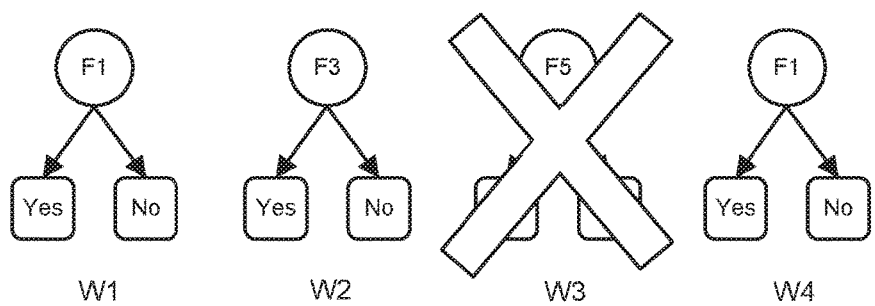

FIG. 8 illustrates an example boosted decision stumps 800 that may be generated by an aspect server processor and used by a device processor to generate lean classifier models in the mobile device. In the example illustrated in FIG. 8, the boosted decision stumps 800 include a plurality of decision nodes W1-W4 that each includes a question or a test condition (e.g., F1, F3, F5), that when executed or performed by a processor, may result in either a definitive binary answer (e.g., true or false, malicious or benign, etc.). Each decision nodes W1-W4 may also be associated with a weight value.

FIG. 8 also illustrates a method 802 of performing "joint feature selection and culling" operations discussed above with reference to FIG. 7. Method 802 may include the analyzer module of a mobile device determining that it needs to generate a lean classifier that tests two unique conditions, in which case the feature selection operations may include traversing the list of 100 boosted decision stumps until the first 2 unique conditions (e.g., F1 and F3 in FIG. 8) are discovered. The analyzer/classifier module 208 may then test only the conditions identified by feature selection operations (e.g., F1 and F3), which may be accomplished by traversing the entire list of 100 boosted decision stumps and deleting any stump that tests a different condition (e.g., F5). The remaining boosted decision stumps (i.e., stumps that tests conditions "F1" and "F3") may be used as a lean classifier without re-training the data. The analyzer/classifier module 208 may apply the behavior information to each of the remaining boosted decision stumps (i.e., stumps that tests conditions "F1" and "F3"), compute a weighted average of all the answers received from the remaining stumps, and use the weighted average to determine if a mobile device behavior is malicious or benign.

Once the boosted decision stumps have been generated through the feature selection and culling process, the selected decision stumps may be used as a classifier or behavior model that may be compared against current device states, settings and behaviors. Since the decision stumps are binary tests that are independent, the behavior analysis process of comparing observed behaviors, which may be summarized in a behavior vector, to the model can be performed in parallel. Also, since the stumps are very simple (basically binary), the processing to perform each stump is very simple and thus can be accomplished quickly with less processing overhead. Each decision stump yields an answer with a weight value, and the ultimate decision regarding whether behaviors are malicious or benign can be determined as the weighted sum of all the results, which is also a simple calculation.

The weight associated with a node may be computed based on information collected from previous observations or analysis of mobile device behaviors, software applications, or processes in the mobile device. The weight associated with each node may also be computed based on how many units of the corpus of data (e.g., cloud corpus of data or behavior vectors) are used to build the boosted decision stumps.

Figure 9:
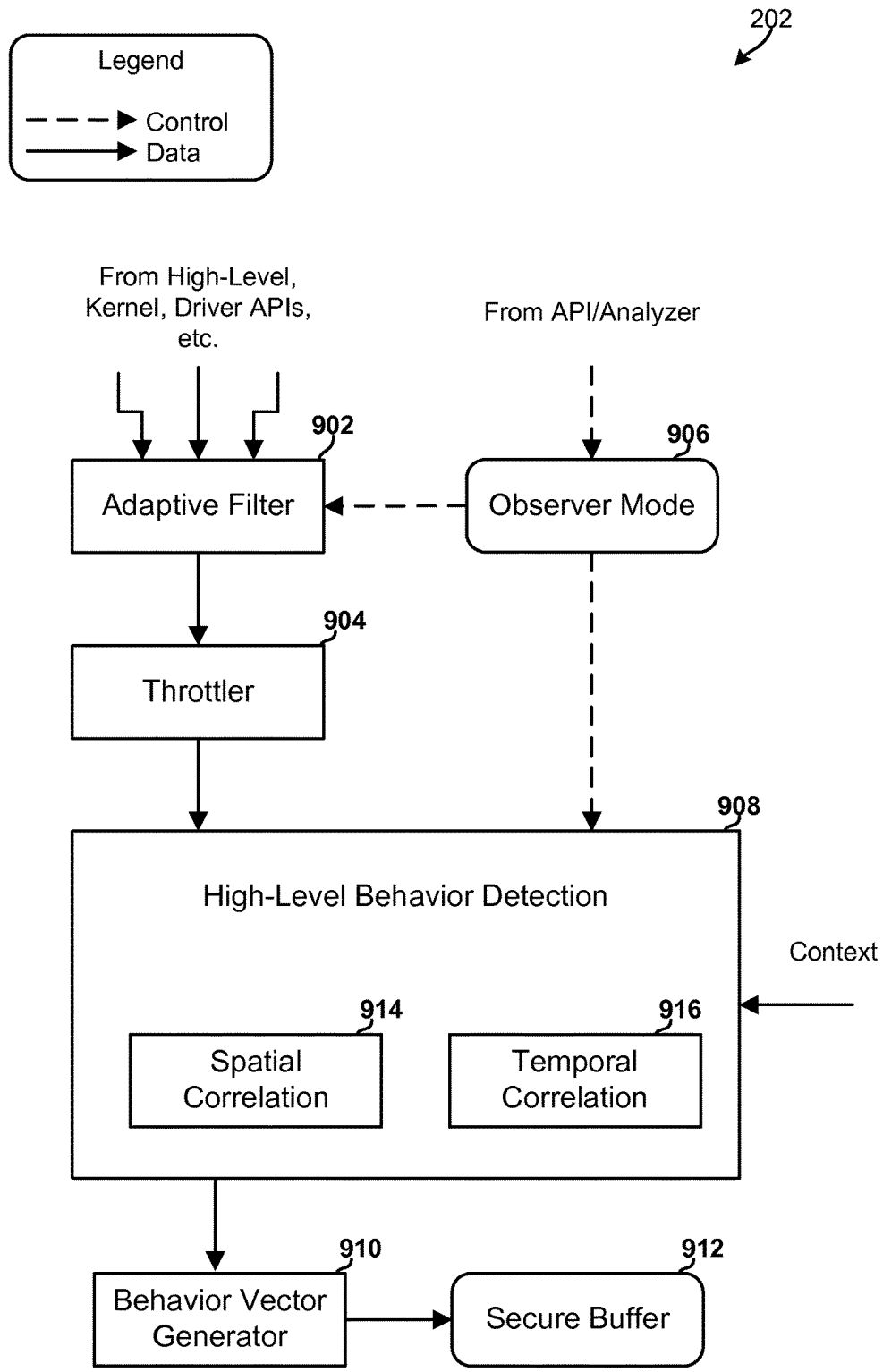
FIG. 9 is a block diagram illustrating example logical components and information flows in an observer module configured to perform dynamic and adaptive observations in accordance with an aspect.

FIG. 9 illustrates example logical components and information flows in a behavior observer module 202 of a computing system configured to perform dynamic and adaptive observations in accordance with an aspect. The behavior observer module 202 may include an adaptive filter module 902, a throttle module 904, an observer mode module 906, a high-level behavior detection module 908, a behavior vector generator 910, and a secure buffer 912. The high-level behavior detection module 908 may include a spatial correlation module 914 and a temporal correlation module 916.

The observer mode module 906 may receive control information from various sources, which may include an analyzer unit (e.g., the behavior analyzer module 204 described above with reference to FIG. 2) and/or an application API. The observer mode module 906 may send control information pertaining to various observer modes to the adaptive filter module 902 and the high-level behavior detection module 908.

The adaptive filter module 902 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 904, which may be responsible for controlling the amount of information flowing from the filter to ensure that the high-level behavior detection module 908 does not become flooded or overloaded with requests or information.

The high-level behavior detection module 908 may receive data/information from the throttle module 904, control information from the observer mode module 906, and context information from other components of the mobile device. The high-level behavior detection module 908 may use the received information to perform spatial and temporal correlations to detect or identify high level behaviors that may cause the device to perform at sub-optimal levels. The results of the spatial and temporal correlations may be sent to the behavior vector generator 910, which may receive the correlation information and generate a behavior vector that describes the behaviors of particular process, application, or sub-system. In an aspect, the behavior vector generator 910 may generate the behavior vector such that each high-level behavior of a particular process, application, or sub-system is an element of the behavior vector. In an aspect, the generated behavior vector may be stored in a secure buffer 912. Examples of high-level behavior detection may include detection of the existence of a particular event, the amount or frequency of another event, the relationship between multiple events, the order in which events occur, time differences between the occurrence of certain events, etc.

In the various aspects, the behavior observer module 202 may perform adaptive observations and control the observation granularity. That is, the behavior observer module 202 may dynamically identify the relevant behaviors that are to be observed, and dynamically determine the level of detail at which the identified behaviors are to be observed. In this manner, the behavior observer module 202 enables the system to monitor the behaviors of the mobile device at various levels (e.g., multiple coarse and fine levels). The behavior observer module 202 may enable the system to adapt to what is being observed. The behavior observer module 202 may enable the system to dynamically change the factors/behaviors being observed based on a focused subset of information, which may be obtained from a wide verity of sources.

As discussed above, the behavior observer module 202 may perform adaptive observation techniques and control the observation granularity based on information received from a variety of sources. For example, the high-level behavior detection module 908 may receive information from the throttle module 904, the observer mode module 906, and context information received from other components (e.g., sensors) of the mobile device. As an example, a high-level behavior detection module 908 performing temporal correlations might detect that a camera has been used and that the mobile device is attempting to upload the picture to a server. The high-level behavior detection module 908 may also perform spatial correlations to determine whether an application on the mobile device took the picture while the device was holstered and attached to the user's belt. The high-level behavior detection module 908 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 908 may recognize this as a potentially threatening behavior and initiate an appropriate response (e.g., shutting off the camera, sounding an alarm, etc.).

In an aspect, the behavior observer module 202 may be implemented in multiple parts.

Figure 10:
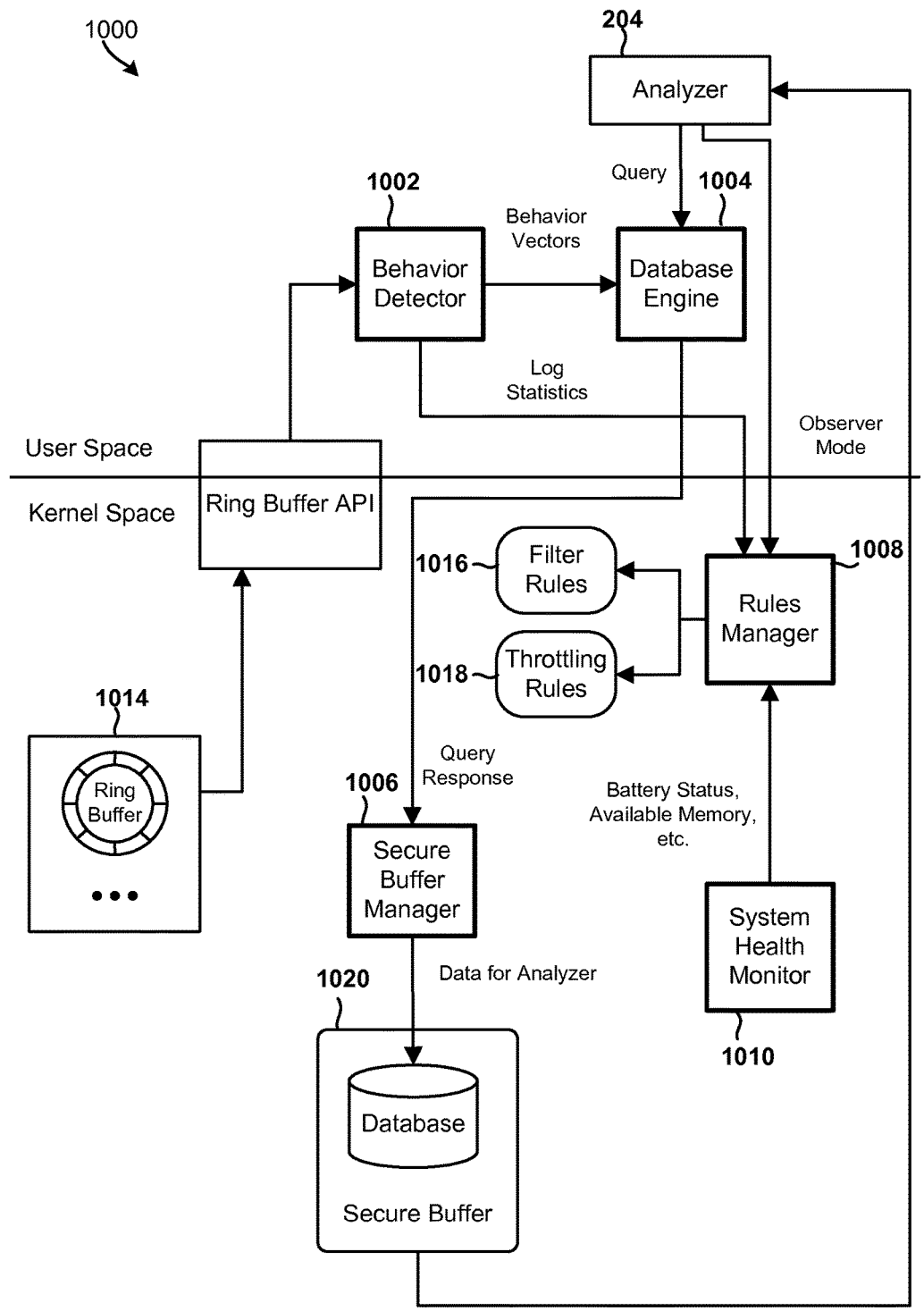
FIG. 10 is a block diagram illustrating logical components and information flows in a computing system implementing observer daemons in accordance with another aspect.

FIG. 10 illustrates in more detail logical components and information flows in a computing system 1000 implementing an aspect observer daemon. In the example illustrated in FIG. 10, the computing system 1000 includes a behavior detector 1002 module, a database engine 1004 module, and a behavior analyzer module 204 in the user space, and a ring buffer 1014, a filter rules 1016 module, a throttling rules 1018 module, and a secure buffer 1020 in the kernel space. The computing system 1000 may further include an observer daemon that includes the behavior detector 1002 and the database engine 1004 in the user space, and the secure buffer manager 1006, the rules manager 1008, and the system health monitor 1010 in the kernel space.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 11:
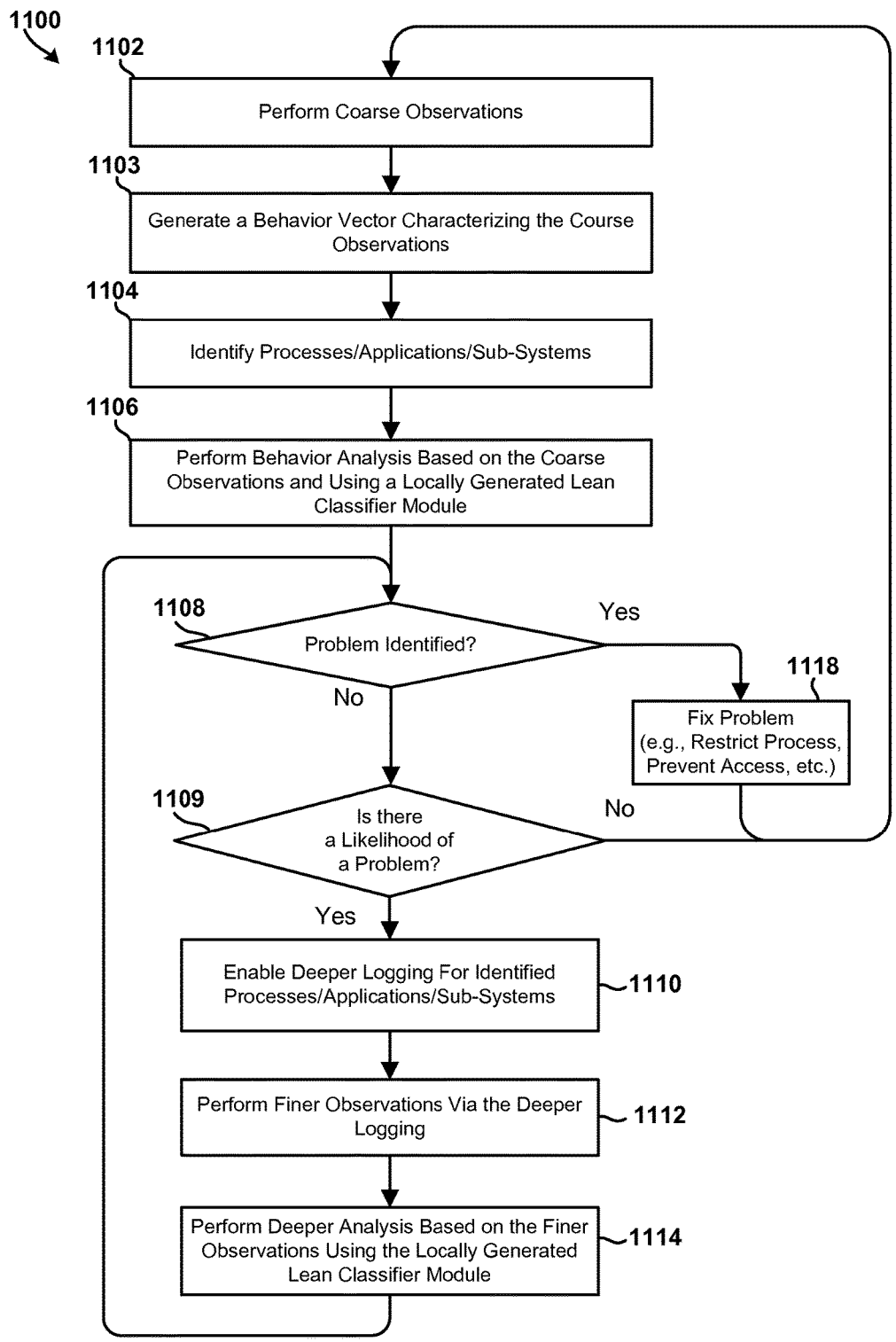
FIG. 11 is a process flow diagram illustrating an aspect method for performing adaptive observations on mobile devices.

FIG. 11 illustrates an example method 1100 for performing dynamic and adaptive observations in accordance with an aspect. In block 1102, the mobile device processor may perform coarse observations by monitoring/observing a subset of large number factors/behaviors that could contribute to the mobile device's degradation. In block 1103, the mobile device processor may generate a behavior vector characterizing the coarse observations and/or the mobile device behavior based on the coarse observations. In block 1104, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 1106, the mobile device processor may perform behavioral analysis operations based on the coarse observations. In aspect, as part of blocks 1103 and 1104, the mobile device processor may perform one or more of the operations discussed above with reference to FIGS. 2-10.

In determination block 1108, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 1108="Yes"), in block 1118, the processor may initiate a process to correct the behavior and return to block 1102 to perform additional coarse observations.

When the mobile device processor determines that the suspicious behaviors or potential problems cannot be identified and/or corrected based on the results of the behavioral analysis (i.e., determination block 1108="No"), in determination block 1109 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 1109="No"), the processor may return to block 1102 to perform additional coarse observations.

When the mobile device processor determines that there is a likelihood that suspicious behaviors or potential problems exist and/or are detectable (i.e., determination block 1109="Yes"), in block 1110, the mobile device processor may perform deeper logging/observations or final logging on the identified subsystems, processes or applications. In block 1112, the mobile device processor may perform deeper and more detailed observations on the identified subsystems, processes or applications. In block 1114, the mobile device processor may perform further and/or deeper behavioral analysis based on the deeper and more detailed observations. In determination block 1108, the mobile device processor may again determine whether the suspicious behaviors or potential problems can be identified and corrected based on the results of the deeper behavioral analysis. When the mobile device processor determines that the suspicious behaviors or potential problems cannot be identified and corrected based on the results of the deeper behavioral analysis (i.e., determination block 1108="No"), the processor may repeat the operations in blocks 1110-1114 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 1108="Yes"), in block 1118, the mobile device processor may perform operations to correct the problem/behavior, and the processor may return to block 1102 to perform additional operations.

In an aspect, as part of blocks 1102-1118 of method 1100, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

As discussed above, the various aspects include methods, and computing devices configured to implement the methods, of using behavior-based and machine learning techniques to efficiently identify, classify, model, prevent, and/or correct the conditions and behaviors that often degrade a computing device's performance, power utilization levels, network usage levels, security and/or privacy over time. To accomplish this, the computing device may perform real-time behavior monitoring and analysis operations, which may include monitoring activities of one or more software applications operating on the computing device (e.g., by monitoring API calls at the hardware, driver, kernel, NDK, SDK, and/or Webkit levels, etc.), generating behavior vector information structures ("behavior vectors") that characterize all or a subset of the monitored activities of one or more software applications, applying the generated behavior vectors to machine-learning classifier models ("classifier models") to generate behavior vector information structure analysis results analysis results, and using the analysis results to classify the behavior vector (and thus the activities characterized by that vector and/or a software application associated with the monitored activities) as benign or non-benign.

As also discussed above, the various aspects include methods of generating classifier models in a computing device, which may include receiving a full classifier model from a server computing device, using the full classifier model to generate a list of boosted decision stumps (e.g., by converting a finite state machine included in the full classifier model into a plurality of boosted decision stumps that each include a test condition and a weight value, etc.), and generating a lean classifier model (or a family of lean classifier models) based on boosted decision stumps included in the list of boosted decision stumps. The computing device may use these locally generated and lean classifier models to evaluate a targeted subset of features included in the full classifier model, such as the features determined to be most relevant to classifying behaviors in that specific computing device. In some embodiments, the computing device may use the lean classifier model by performing operations that include applying behavior information included in a behavior vector information structure to the boosted decision stumps included in the lean classifier model, computing a weighted average of the results of applying the collected behavior information to each boosted decision stump in the lean classifier model, and comparing the weighted average to a threshold value to determine whether a behavior of the mobile device is non-benign. Said another way, applying a behavior vector to a classifier model may generate analysis results in the form of a numeric value (P) that is between zero (0) and one (1). Depending on how the computing device is configured, values that are close to zero (e.g., 0.1) may indicate that the behavior represented by the behavior vector is benign, and values that are close to one (e.g., 0.9) may indicate that the behavior is non-benign (or vice versa).

The leanest classifiers in the family of lean classifier models (i.e., the lean classifier model that includes the fewest decision nodes or evaluates the fewest number of test conditions) may be applied routinely until a behavior (or behavior vector) is encountered that the model cannot categorize as either benign or non-benign, at which time a more robust (i.e., less lean) lean classifier model may be selected and applied in an attempt to categorize the behavior as either benign or malicious. That is, to conserve resources, the computing device processor may first apply the behavior vector to a lean classifier model (also sometimes called "reduced features model" or "RFM") that evaluates a small subset of all the features/factors available (e.g., 20 features), and then use progressively larger classifier models until the processor determines with a high degree of confidence that the behavior is one of benign or non-benign (e.g., until the resulting numeric value P is lower than the lower threshold value or greater the upper threshold value).

For example, the computing device may first apply the behavior vector to a classifier model that evaluates twenty features (i.e., to a RFM-20). If the analysis results are below a first threshold (e.g., P<0.1), the computing device may classify that behavior as benign with a high degree of confidence and without further analysis. Similarly, if the analysis results are above a second threshold (e.g., >0.9), the computing device may classify that behavior without further analysis as non-benign with a high degree of confidence. On the other hand, the computing device may not be able to classify the behavior as benign or non-benign with a (sufficiently) high degree of confidence when the analysis results fall between the first and second thresholds (e.g., P>=0.1||P<=0.9). In this case, the computing device may apply the behavior vector to a larger classifier model (e.g., a RFM-40 or a classifier model that evaluates 40 features) to generate a new analysis results, and repeat the operations discussed above. The computing device may repeat these operations until the analysis results indicate that the behavior is benign or non-benign with a high degree of confidence (e.g., until P<0.1||P>0.9).

While the above-described system is generally effective, the numeric value (P) is not always a true probability value. As a result, this numeric value (P) may not always accurately represent the likelihood that the behavior is benign or non-benign. This is because to compute P, the system may be first required to compute a confidence value (c) using a formula such as $$P = \frac{1}{1 + e^{-2c}}.$$

Due to the distinctive behaviors of benign and non-benign applications, confidence values (c) using this formula may cluster around one of the two extremes of very close to 1 or very close to 0. As a result, the use of the above formula may yield results that are highly clustered around the two extremes (i.e., the resulting P value may be very close to 1 or very close to 0).

In view of these facts, the computing device may be configured to use sigmoid parameters ($\alpha$ and $\beta$) to compute a normalized confidence value ($\hat{c}$), and use the normalized confidence value ($\hat{c}$) to classify behaviors as benign or non-benign in order to better determine whether continue evaluating the behavior (e.g., whether to select a more robust classifier model, etc.).

In an aspect, the computing device may be configured to compute the normalized confidence value ($\hat{C}$) using the formula:

$$\hat{c} = \begin{cases} \frac{1}{1 + e^{\alpha c}}, & c < 0 \\ \frac{1}{1 + e^{\beta c}}, & x \geq 0 \end{cases}$$

As shown in the formula above, the normalized confidence value ($\hat{c}$) may be defined by the sigmoid parameters $\alpha$ and $\beta$ and a raw confidence value (c). The computing device may be configured to perform operations to implement the above-formula so as to compute a normalized confidence value ($\hat{c}$). The computing device may use the normalized confidence value ($\hat{c}$) to determine whether to select a larger or robust classifier model or whether the current analysis results indicate that the behavior may be classified as benign or non-benign with a sufficiently high degree of confidence.

By using the normalized confidence value ($\hat{c}$), the computing device may reduce the number of vectors that are misclassified, reduce the number of false positive, reduce the number of false negatives, and reduce the number of times behaviors are classified as suspicious and requiring further analysis with a more robust classifier model. As a result, the computing device may more accurately and efficiently classify device behaviors, better determine whether a behavior is benign or non-benign, and more efficiently determine whether additional analysis, such as the selection and use of a larger or more robust classifier model, will result in a more accurate classification of device behaviors.

In some aspects, the computing device may be configured to receive updated or revised sigmoid parameters α and β in conjunction with receiving a new classifier model from the server computing device. In some aspects, the computing device may be configured to update or revise the sigmoid parameters α and β locally on the computing device based on historical information (e.g., collected from prior executions, previous applications of behavior models, previously determined normalized confidence values, etc.), new information, machine learning, context modeling, and detected changes in the available information, mobile device states, environmental conditions, network conditions, mobile device performance, battery consumption levels, etc.

In some aspects, the computing device may be configured to send the locally updated or revised sigmoid parameters α and β to the server computing device, which may receive and use these parameters (e.g., by crowd sourcing the parameters with other sigmoid parameters received from many other devices) to update the classifier models and/or generate new sigmoid parameters α and β for the classifier models in the server. Such feedback communications allow the system to continuously refine and adjust its models and operations for improved (e.g., more accurate, more efficient, etc.) behavior classification.

Figure 12:
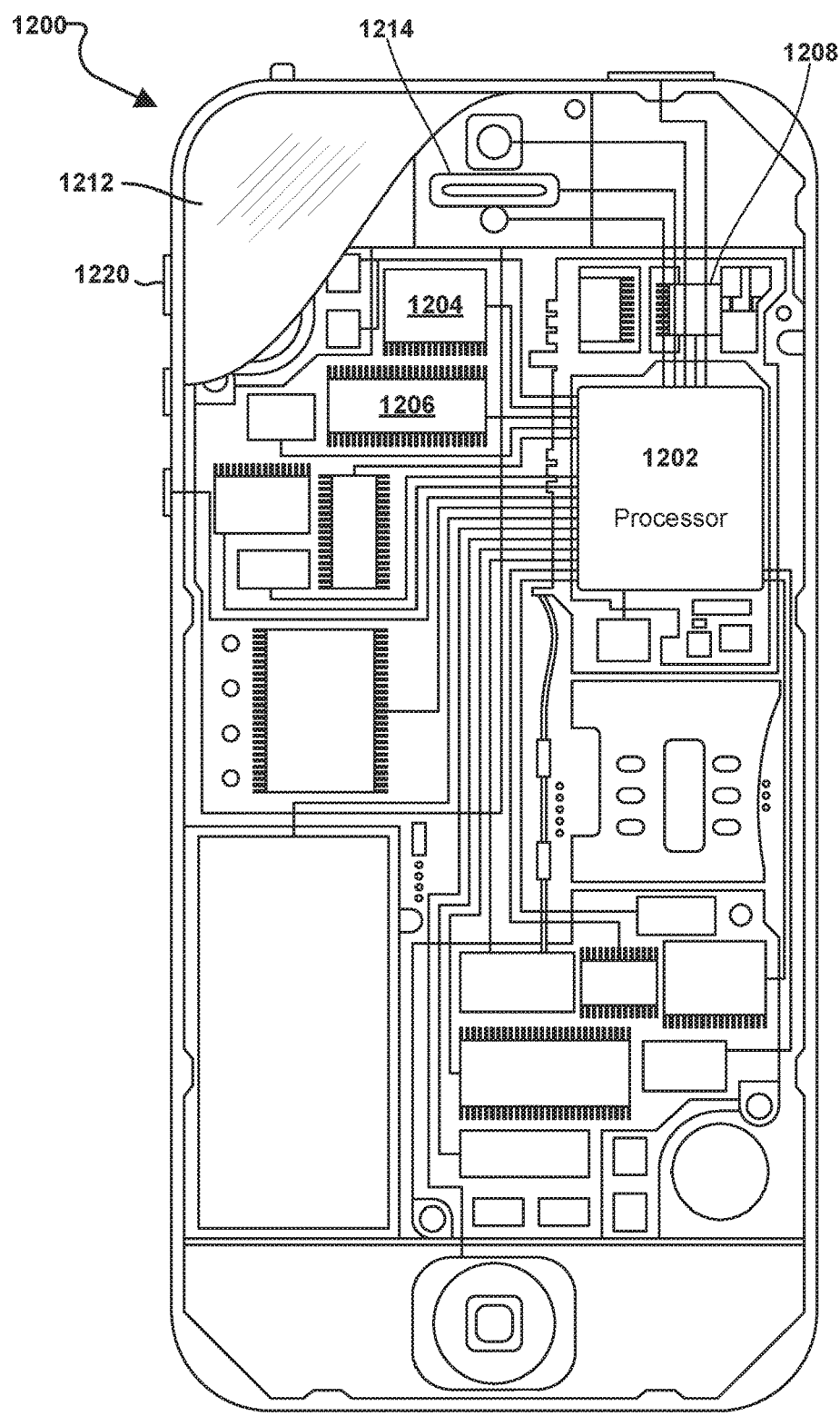
FIGS. 12-16 are process flow diagrams illustrating methods of using sigmoid parameters to compute and use a normalized confidence value for improved behavior analysis and classification in accordance with various aspects.

FIG. 12 illustrates a method 1200 of using the normalized confidence value (ĉ) for improved behavior classification in accordance with an aspect. In block 1202, a processor of a computing device may receive a full classifier model and sigmoid parameters (e.g., α and β) from a server computing device. In an embodiment, the full classifier model may include a finite state machine that includes information suitable for expression as a plurality of boosted decision stumps. Each boosted decision stump may include a test condition and a weight value, and each test condition may associated with a probability value that identifies a likelihood that its associated test condition will enable the computing device to determine whether the behavior is one of benign and non-benign.

In block 1204, the processor may determine or compute a normalized confidence value based on the received sigmoid parameters, such as by using the formula:

$$\hat{c} = \begin{cases} \dfrac{1}{1+e^{\alpha c}}, & c < 0 \\ \dfrac{1}{1+e^{\beta c}}, & x \geq 0 \end{cases}$$

In block 1206, the computing device may use the normalized confidence value to classify a device behavior. For example, in an aspect, the computing device may generate a list of boosted decision stumps by converting a finite state machine included in the received full classifier model into the plurality of boosted decision stumps, generate a family of lean classifier models based on the boosted decision stumps included in the list of boosted decision stumps, apply a behavior vector data/information structure to a first lean classifier model in the family of classifier models to generate analysis results, and determine whether to apply the behavior vector data/information structure to a second lean classifier model in the family of classifier models to generate new analysis results based on the normalized confidence value, and classify the behavior as one of benign or non-benign based on the generated analysis results in response to determining based on the normalized confidence value that the use of a stronger classifier model will not increase the accuracy of the behavior classification.

Figure 13:
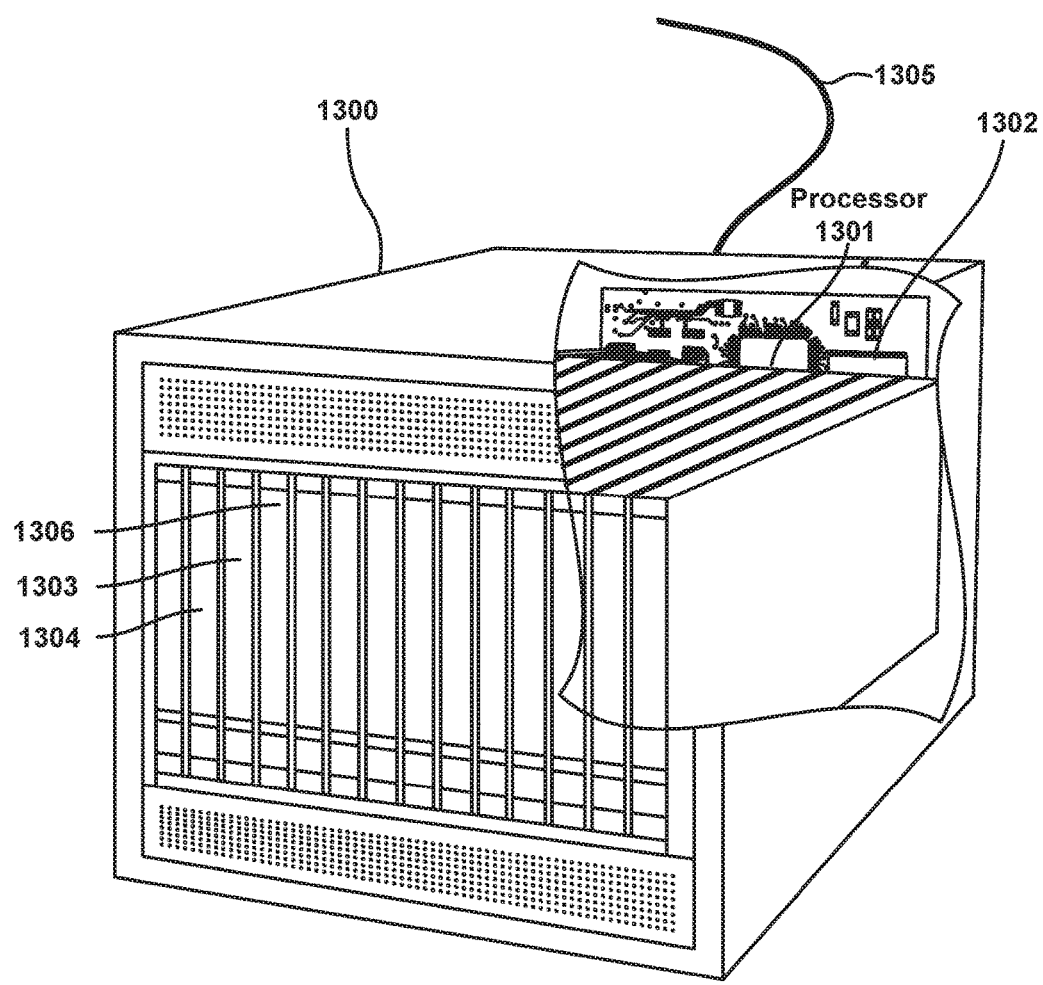

FIG. 13 illustrates a method 1300 of using the normalized confidence value (ĉ) for improved behavior classification in accordance with another aspect. In block 1302, a processor of a computing device may receive a full classifier model and sigmoid parameters from a server computing device. In block 1304, the processor may generate a lean classifier model based on the received full classifier model. In block 1306, the processor may determine/compute a normalized confidence value based on the received sigmoid parameters. In block 1308, the processor may apply a behavior vector information structure to the lean classifier model to generate analysis results. In block 1310, the processor may use the analysis results and the normalized confidence value to determine whether the behavior of the computing device is benign or non-benign.

Figure 14:
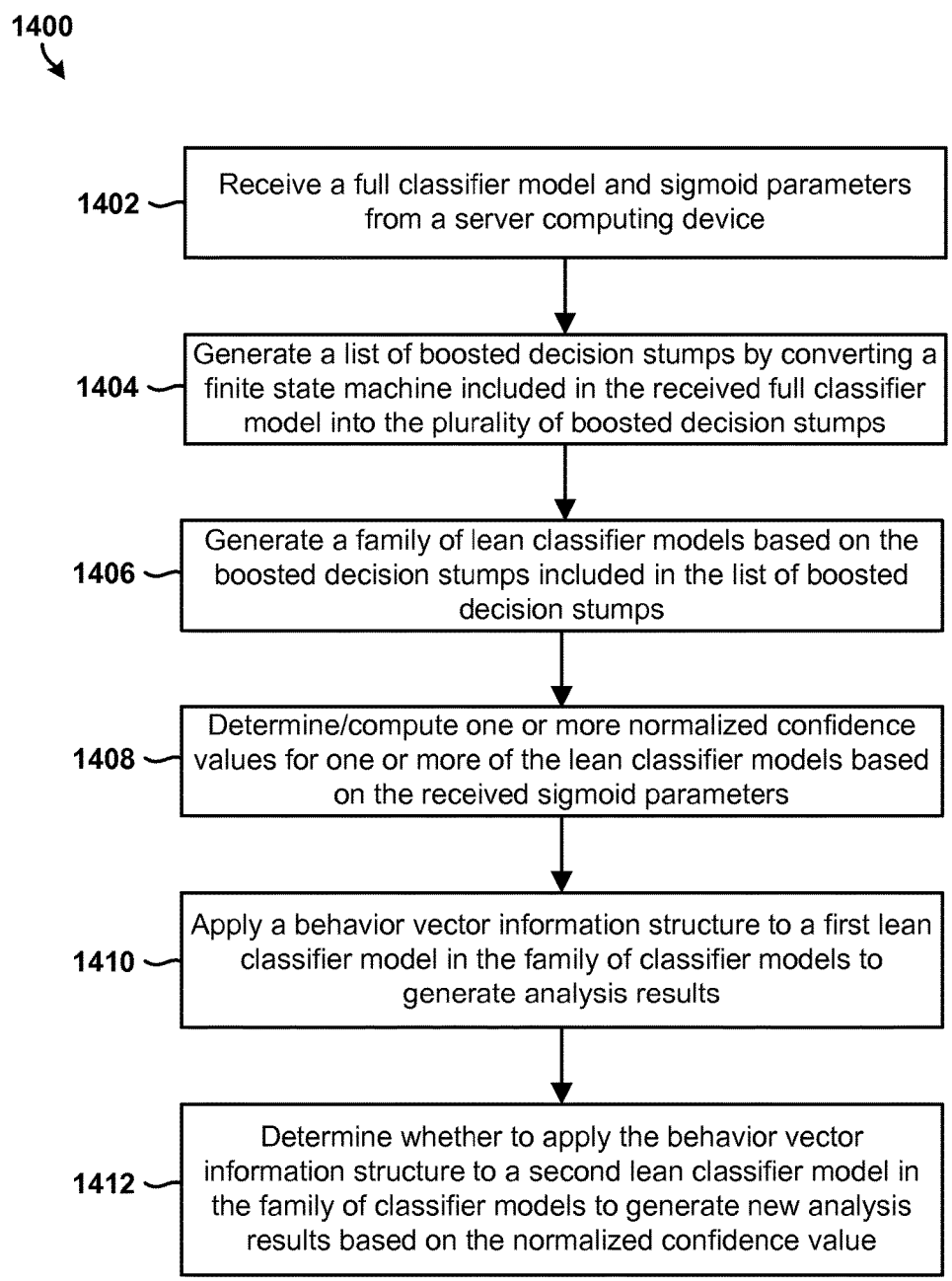

FIG. 14 illustrates a method 1400 of using the normalized confidence value (ĉ) for improved behavior classification in accordance with yet another aspect. In block 1402, a processor of a computing device may receive a full classifier model and sigmoid parameters from a server computing device. In block 1404, the processor may generate a list of boosted decision stumps by converting a finite state machine included in the received full classifier model into the plurality of boosted decision stumps. In block 1406, the processor may generate a family of lean classifier models based on the boosted decision stumps included in the list of boosted decision stumps. In block 1408, the processor may determine/compute one or more normalized confidence values for one or more of the lean classifier models based on the received sigmoid parameters. For example, in an aspect, the processor may compute a single normalized confidence value for all of the lean classifier models in the family of lean classifier models. In another aspect, the processor may compute a normalized confidence value for each of the lean classifier models in the family of lean classifier models.

In block 1408, the processor may apply a behavior vector information structure to the first lean classifier model in the family of classifier models to generate analysis results. In block 1410, the processor may determine whether to apply the behavior vector information structure to a second lean classifier model in the family of classifier models to generate new analysis results based on a normalized confidence value (e.g., the normalized confidence value associated with the first or second lean classifier models, etc.).

Figure 15:
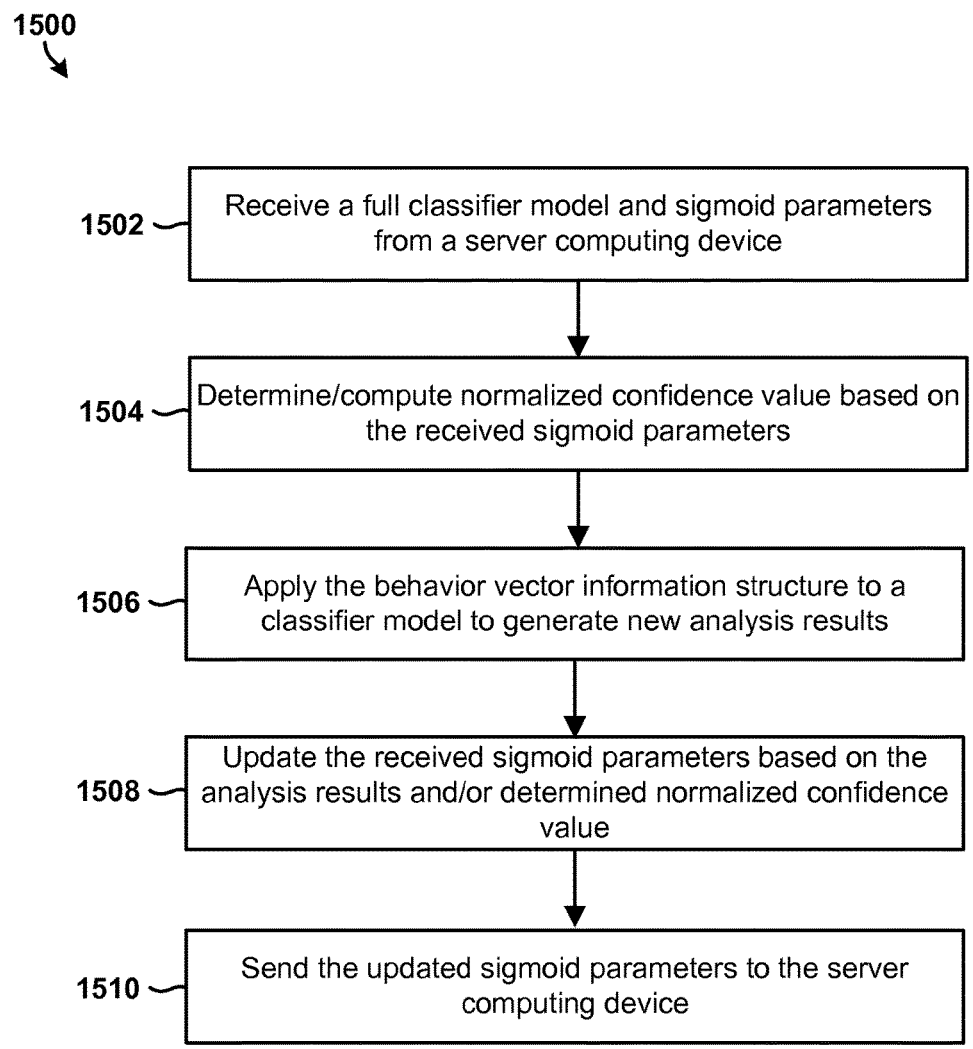

FIG. 15 illustrates a method 1500 of using the normalized confidence value (ĉ) for improved behavior classification in accordance with yet another aspect. In block 1502, a processor of a computing device may receive a full classifier model and sigmoid parameters from a server computing device. In block 1504, the processor may determine/compute normalized confidence value based on the received sigmoid parameters. In block 1506, the processor may apply the behavior vector information structure to a classifier model to generate new analysis results. In block 1508, the processor may update or revise the received sigmoid parameters based on the analysis results and/or determined normalized confidence value. In block 1510, the processor may send the updated sigmoid parameters to the server computing device. That is, in block 1510, the computing device may send the locally updated or revised sigmoid parameters α and β to the server computing device, which may receive and use these parameters (e.g., by crowd sourcing the parameters with other sigmoid parameters received from many other devices) to update the classifier models and/or generate new sigmoid parameters α and β for the classifier models in the server. This allows the system to continuously refine and adjust its models and operations for improved (e.g., more accurate, more efficient, etc.) behavior classification.

Figure 16:
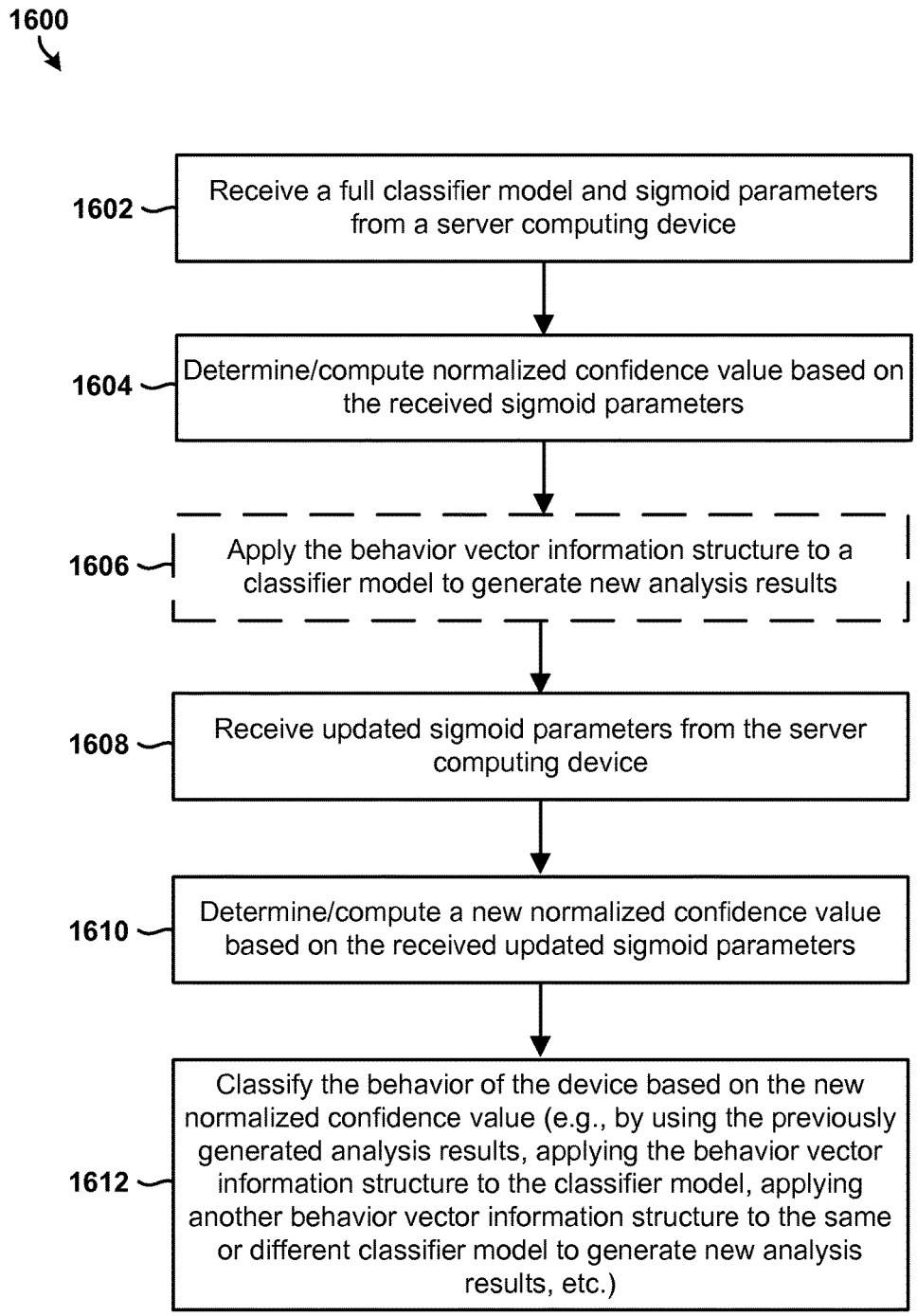

FIG. 16 illustrates a method 1600 of using the normalized confidence value (ĉ) for improved behavior classification in accordance with yet another aspect. In block 1602, a processor of a computing device may receive a full classifier model and sigmoid parameters from a server computing device. In block 1604, the processor may determine/compute a normalized confidence value based on the received sigmoid parameters. In optional block 1606, the processor may apply the behavior vector information structure to a classifier model to generate new analysis results. In block 1608, the processor may receive updated sigmoid parameters from the server computing device. In block 1610, the processor may determine/compute a new normalized confidence value based on the received updated sigmoid parameters. In block 1612, the processor may classify the behavior of the computing device based on the new normalized confidence value, such as by applying the behavior vector information structure to the classifier model to generate analysis results, using previously generated analysis results in conjunction with the new normalized confidence value, applying another behavior vector information structure to the same or different classifier model to generate new analysis results, etc.

Figure 17:
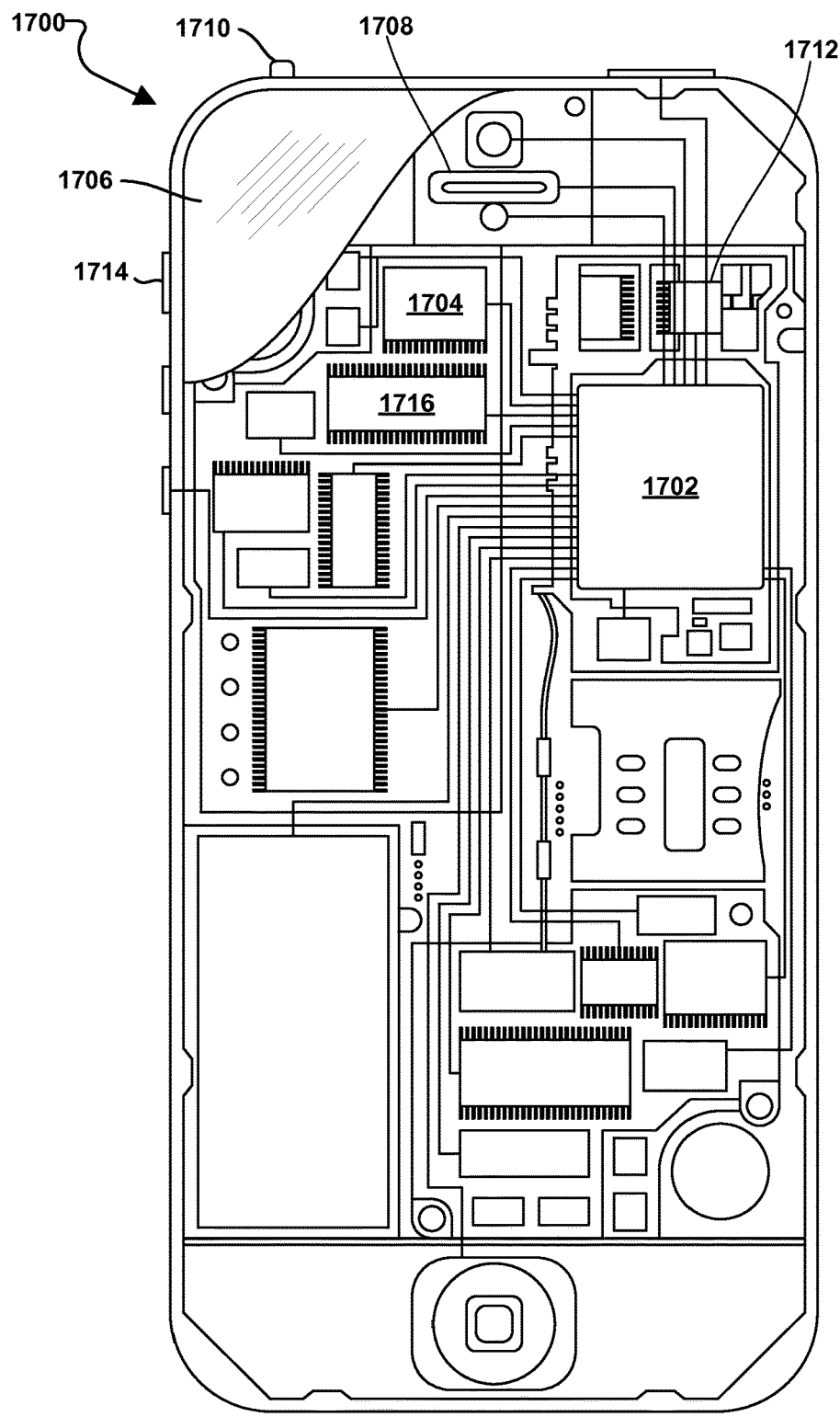
FIG. 17 is a component block diagram of a mobile device suitable for use in an aspect.

The various aspects may be implemented on a variety of computing devices, an example of which is illustrated in FIG. 17 in the form of a smartphone. A smartphone 1700 may include a processor 1702 coupled to internal memory 1704, a display 1706, and to a speaker 1708. Additionally, the smartphone 1700 may include an antenna 1710 for sending and receiving electromagnetic radiation that may be connected to a wireless data link and/or cellular telephone/wireless transceiver 1712 coupled to the processor 1702. Smartphones 1700 typically also include menu selection buttons or rocker switches XX20 for receiving user inputs.

A typical smartphone 1700 also includes a sound encoding/decoding (CODEC) circuit 1716, which digitizes sound received from a microphone into data packets suitable for wireless transmission and decodes received sound data packets to generate analog signals that are provided to the speaker to generate sound. Also, one or more of the processor 1702, wireless transceiver 1712 and CODEC 1716 may include a digital signal processor (DSP) circuit (not shown separately).

Figure 18:
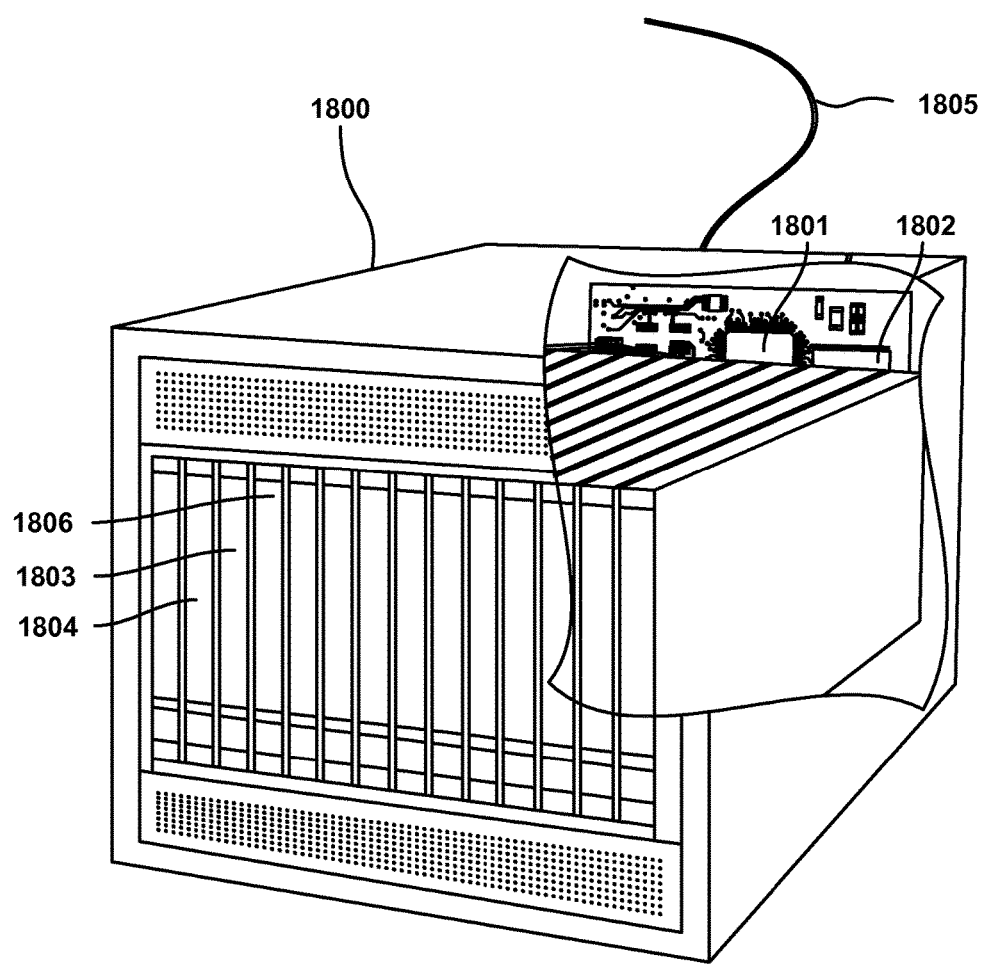
FIG. 18 is a component block diagram of a server device suitable for use in an aspect.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 1800 illustrated in FIG. 18. Such a server 1800 typically includes a processor 1801 coupled to volatile memory 1802 and a large capacity nonvolatile memory, such as a disk drive 1803. The server 1800 may also include a floppy disc drive, compact disc (CD) or DVD disc drive 1804 coupled to the processor 1801. The server 1800 may also include network access ports 1806 coupled to the processor 1801 for establishing data connections with a network 1805, such as a local area network coupled to other broadcast system computers and servers.

The processors 1702, 1801 may be any programmable microprocessor, microcomputer or multiple processor chip or chips that can be configured by software instructions (applications) to perform a variety of functions, including the functions of the various aspects described below. In some mobile devices, multiple processors 1702 may be provided, such as one processor dedicated to wireless communication functions and one processor dedicated to running other applications. Typically, software applications may be stored in the internal memory 1704, 1802, 1803 before they are accessed and loaded into the processor 1702, 1801. The processor 1702, 1801 may include internal memory sufficient to store the application software instructions.

The term "performance degradation" is used in this application to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), operations relating to commandeering the mobile device or utilizing the phone for spying or botnet activities, etc.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method of analyzing behaviors in a computing device, comprising:
   receiving, in a processor of the computing device from a server computing device, a full classifier model and sigmoid parameters;
   determining, via the processor, a normalized confidence value based on the received sigmoid parameters; and
   classifying, via the processor, a device behavior of the computing device based on a combination of:
      an analysis result generated by applying a behavior vector information structure to a lean classifier model; and
      the normalized confidence value determined based on the received sigmoid parameters.

2. The method of claim 1, further comprising:
   generating a list of boosted decision stumps by converting a finite state machine included in the full classifier model into boosted decision stumps; and
   generating a family of lean classifier models based on the boosted decision stumps included in the list of boosted decision stumps,
   wherein classifying the device behavior of the computing device comprises:
      applying the behavior vector information structure to a first lean classifier model in the family of lean classifier models to generate the analysis result; and
      determining whether to apply the behavior vector information structure to a second lean classifier model in the family of lean classifier models to generate a new analysis result based on the normalized confidence value.

3. The method of claim 1, further comprising generating the lean classifier model based on the full classifier model.

4. The method of claim 3, wherein generating the lean classifier model based on the full classifier model comprises:
   generating a list of boosted decision stumps by converting a finite state machine included in the full classifier model into a plurality of boosted decision stumps;
   determining a number of different test conditions that should be evaluated to classify the device behavior of the computing device without consuming an excessive amount of processing, memory, or energy resources of the computing device;
   generating a list of test conditions by sequentially traversing the list of boosted decision stumps and inserting a test condition associated with each sequentially traversed boosted decision stump into the list of test conditions until the list of test conditions includes the number of different test conditions; and generating the lean classifier model to include only those boosted decision stumps that test one of a plurality of test conditions included in the list of test conditions.

5. The method of claim 1, wherein classifying the device behavior of the computing device comprises:
applying collected behavior information included in the behavior vector information structure to each of a plurality of boosted decision stumps included in the lean classifier model;
computing a weighted average of a result of applying the collected behavior information to each of the plurality of boosted decision stumps included in the lean classifier model; and
classifying the device behavior of the computing device based on a result of comparing the weighted average to a threshold value.

6. The method of claim 1, further comprising:
generating an updated sigmoid parameter based on the normalized confidence value; and
sending the updated sigmoid parameter to the server computing device.

7. The method of claim 1, further comprising:
receiving an updated sigmoid parameter from the server computing device;
determining a new normalized confidence value based on the updated sigmoid parameter received from the server computing device; and
classifying the device behavior of the computing device based on the new normalized confidence value.

8. The method of claim 1, wherein receiving the full classifier model and the sigmoid parameters comprises receiving a finite state machine that includes information suitable for expression as two or more boosted decision stumps that each include a weight value and a test condition that is associated with a probability value that identifies a likelihood that the test condition will enable the computing device to determine whether the device behavior of the computing device is one of benign and non-benign.

9. A computing device, comprising:
means for receiving from a server computing device a full classifier model and sigmoid parameters;
means for determining a normalized confidence value based on the received sigmoid parameters; and
means for classifying a device behavior of the computing device based on a combination of:
an analysis result generated by applying a behavior vector information structure to a lean classifier model; and
the normalized confidence value determined based on the received sigmoid parameters.

10. The computing device of claim 9, further comprising:
means for generating a list of boosted decision stumps by converting a finite state machine included in the full classifier model into boosted decision stumps; and
means for generating a family of lean classifier models based on the boosted decision stumps included in the list of boosted decision stumps;
wherein means for classifying the device behavior of the computing device comprises:
means for applying the behavior vector information structure to a first lean classifier model in the family of lean classifier models to generate the analysis result; and
means for determining whether to apply the behavior vector information structure to a second lean classifier model in the family of lean classifier models to generate a new analysis result based on the normalized confidence value.

11. The computing device of claim 9, further comprising means for generating the lean classifier model based on the full classifier model.

12. The computing device of claim 11, wherein means for generating the lean classifier model based on the full classifier model comprises:
means for generating a list of boosted decision stumps by converting a finite state machine included in the full classifier model into a plurality of boosted decision stumps;
means for determining a number of different test conditions that should be evaluated to classify the device behavior of the computing device without consuming an excessive amount of processing, memory, or energy resources of the computing device;
means for generating a list of test conditions by sequentially traversing the list of boosted decision stumps and inserting a test condition associated with each sequentially traversed boosted decision stump into the list of test conditions until the list of test conditions includes the number of different test conditions; and
means for generating the lean classifier model to include only those boosted decision stumps that test one of a plurality of test conditions included in the list of test conditions.

13. The computing device of claim 9, wherein means for classifying the device behavior of the computing device comprises:
means for applying collected behavior information included in the behavior vector information structure to each of a plurality of boosted decision stumps included in the lean classifier model;
means for computing a weighted average of a result of applying the collected behavior information to each of the plurality of boosted decision stumps included in the lean classifier model; and
means for classifying the device behavior of the computing device based on a result of comparing the weighted average to a threshold value.

14. The computing device of claim 9, further comprising:
means for generating an updated sigmoid parameter based on the normalized confidence value; and
means for sending the updated sigmoid parameter to the server computing device.

15. The computing device of claim 9, further comprising:
means for receiving an updated sigmoid parameter from the server computing device;
means for determining a new normalized confidence value based on the updated sigmoid parameter; and
means for classifying the device behavior of the computing device based on the new normalized confidence value.

16. The computing device of claim 9, wherein means for receiving the full classifier model and the sigmoid parameters comprises means for receiving a finite state machine that includes information suitable for expression as two or more boosted decision stumps that each include a weight value and a test condition that is associated with a probability value that identifies a likelihood that the test condition will enable the computing device to determine whether the device behavior of the computing device is one of benign and non-benign.

17. A computing device, comprising:
a processor configured with processor-executable instructions to:
receive from a server computing device a full classifier model and sigmoid parameters;
determine a normalized confidence value based on the received sigmoid parameters; and
classify a device behavior of the computing device based on a combination of:
an analysis result generated by applying a behavior vector information structure to a lean classifier model; and
the normalized confidence value determined based on the received sigmoid parameters.

18. The computing device of claim 17, wherein the processor is further configured with processor-executable instructions to:
generate a list of boosted decision stumps by converting a finite state machine included in the full classifier model into boosted decision stumps; and
generate a family of lean classifier models based on the boosted decision stumps included in the list of boosted decision stumps, and wherein the processor is further configured with processor-executable instructions such that classifying the device behavior of the computing device is performed by:
applying the behavior vector information structure to a first lean classifier model in the family of lean classifier models to generate the analysis result; and
determining whether to apply the behavior vector information structure to a second lean classifier model in the family of lean classifier models to generate a new analysis result based on the normalized confidence value.

19. The computing device of claim 17, wherein:
the processor is further configured with processor-executable instructions to generate the lean classifier model based on the full classifier model.

20. The computing device of claim 19, wherein the processor is further configured with processor-executable instructions such that generating the lean classifier model based on the full classifier model is performed by:
generating a list of boosted decision stumps by converting a finite state machine included in the full classifier model into a plurality of boosted decision stumps;
determining a number of different test conditions that should be evaluated to classify the device behavior of the computing device without consuming an excessive amount of processing, memory, or energy resources of the computing device;
generating a list of test conditions by sequentially traversing the list of boosted decision stumps and inserting a test condition associated with each sequentially traversed boosted decision stump into the list of test conditions until the list of test conditions includes the number of different test conditions; and
generating the lean classifier model to include only those boosted decision stumps that test one of a plurality of test conditions included in the list of test conditions.

21. The computing device of claim 17, wherein the processor is further configured with processor-executable instructions such that classifying the device behavior of the computing device is performed by:
applying collected behavior information included in the behavior vector information structure to each of a plurality of boosted decision stumps included in the lean classifier model;
computing a weighted average of a result of applying the collected behavior information to each of the plurality of boosted decision stumps included in the lean classifier model; and
classifying the device behavior of the computing device based on a result of comparing the weighted average to a threshold value.

22. The computing device of claim 17, wherein the processor is further configured with processor-executable instructions to:
generate an updated sigmoid parameter based on the normalized confidence value; and
send the updated sigmoid parameter to the server computing device.

23. The computing device of claim 17, wherein the processor is further configured with processor-executable instructions to:
receive an updated sigmoid parameter from the server computing device;
determine a new normalized confidence value based on the updated sigmoid parameter; and
classify the device behavior of the computing device based on the new normalized confidence value.

24. The computing device of claim 17, wherein the processor is further configured with processor-executable instructions such that receiving the full classifier model and the sigmoid parameters is performed by receiving a finite state machine that includes information suitable for expression as two or more boosted decision stumps that each include a weight value and a test condition that is associated with a probability value that identifies a likelihood that the test condition will enable the processor to determine whether the device behavior of the computing device is one of benign and non-benign.

25. A non-transitory computer readable storage medium having stored thereon processor-executable software instructions configured to cause a processor of a of a computing device to perform operations comprising:
receiving from a server computing device a full classifier model and sigmoid parameters;
determining a normalized confidence value based on the received sigmoid parameters; and
classifying a device behavior of the computing device based on a combination of:
an analysis result generated by applying a behavior vector information structure to a lean classifier model; and
the normalized confidence value determined based on the received sigmoid parameters the normalized confidence value.

26. The non-transitory computer readable storage medium of claim 25, wherein the stored processor-executable instructions are configured to cause the processor to perform operations further comprising:
generating a list of boosted decision stumps by converting a finite state machine included in the full classifier model into boosted decision stumps; and
generating a family of lean classifier models based on the boosted decision stumps included in the list of boosted decision stumps;
wherein classifying the device behavior of the computing device comprises:
applying the behavior vector information structure to a first lean classifier model in the family of lean classifier models to generate the analysis result; and
determining whether to apply the behavior vector information structure to a second lean classifier model in the family of lean classifier models to generate a new analysis result based on the normalized confidence value.

27. The non-transitory computer readable storage medium of claim 25, wherein the stored processor-executable instructions are configured to cause the processor to perform operations further comprising generating the lean classifier model based on the full classifier model.

28. The non-transitory computer readable storage medium of claim 27, wherein the stored processor-executable instructions are configured to cause the processor to perform operations such that generating the lean classifier model based on the full classifier model comprises:
   generating a list of boosted decision stumps by converting a finite state machine included in the full classifier model into a plurality of boosted decision stumps;
   determining a number of different test conditions that should be evaluated to classify the device behavior of the computing device without consuming an excessive amount of processing, memory, or energy resources of the computing device;
   generating a list of test conditions by sequentially traversing the list of boosted decision stumps and inserting a test condition associated with each sequentially traversed boosted decision stump into the list of test conditions until the list of test conditions includes the number of different test conditions; and
   generating the lean classifier model to include only those boosted decision stumps that test one of a plurality of test conditions included in the list of test conditions.

29. The non-transitory computer readable storage medium of claim 25, wherein the stored processor-executable instructions are configured to cause the processor to perform operations further comprising:
   generating an updated sigmoid parameter based on the normalized confidence value; and
   sending the updated sigmoid parameter to the server computing device.

30. The non-transitory computer readable storage medium of claim 25, wherein the stored processor-executable instructions are configured to cause the processor to perform operations further comprising:
   receiving an updated sigmoid parameter from the server computing device;
   determining a new normalized confidence value based on the updated sigmoid parameter; and
   classifying the device behavior of the computing device based on the new normalized confidence value.

* * * * *